(12) United States Patent
Kobayashi et al.

(10) Patent No.: US 10,469,762 B2
(45) Date of Patent: Nov. 5, 2019

(54) IMAGE PICKUP DEVICE, IMAGE PICKUP SYSTEM, AND MOVABLE BODY

(71) Applicant: CANON KABUSHIKI KAISHA, Tokyo (JP)

(72) Inventors: Daisuke Kobayashi, Kawaguchi (JP); Itsutaku Sano, Tokyo (JP); Kazuhiro Saito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/042,784

(22) Filed: Jul. 23, 2018

(65) Prior Publication Data

US 2019/0037122 A1 Jan. 31, 2019

(30) Foreign Application Priority Data

Jul. 25, 2017 (JP) ................................ 2017-143685

(51) Int. Cl.
| | | |
|---|---|---|
| *H04N 5/235* | (2006.01) | |
| *H04N 5/374* | (2011.01) | |
| *H04N 5/353* | (2011.01) | |
| *H04N 5/341* | (2011.01) | |
| *H04N 5/357* | (2011.01) | |
| *H04N 5/3745* | (2011.01) | |

(52) U.S. Cl.
CPC .......... *H04N 5/2353* (2013.01); *H04N 5/341* (2013.01); *H04N 5/3532* (2013.01); *H04N 5/3577* (2013.01); *H04N 5/3745* (2013.01); *H04N 5/37452* (2013.01)

(58) Field of Classification Search
CPC .... H04N 5/2353; H04N 5/341; H04N 5/3577; H04N 5/37452; H04N 5/3532; H04N 5/3745
See application file for complete search history.

(56) References Cited

U.S. PATENT DOCUMENTS

| | | | |
|---|---|---|---|
| 8,427,564 B2* | 4/2013 | Yamashita | H04N 5/335 348/294 |
| 8,456,559 B2* | 6/2013 | Yamashita | H01L 27/14643 348/308 |
| 9,344,653 B2* | 5/2016 | Shimotsusa | H04N 5/369 |
| 10,009,560 B2* | 6/2018 | Kobayashi | H04N 3/1525 |
| 2010/0165167 A1* | 7/2010 | Sugiyama | H04N 5/3597 348/311 |
| 2015/0264243 A1* | 9/2015 | Ichikawa | H04N 5/2353 348/296 |
| 2017/0078557 A1* | 3/2017 | Kawabata | H04N 5/23212 |
| 2017/0078594 A1* | 3/2017 | Kawabata | H04N 5/3535 |
| 2017/0078604 A1* | 3/2017 | Kobayashi | H01L 27/146 |
| 2017/0359535 A1* | 12/2017 | Kobayashi | H04N 3/1525 |
| 2018/0175103 A1* | 6/2018 | Ryoki | H01L 27/14812 |

FOREIGN PATENT DOCUMENTS

| | | |
|---|---|---|
| JP | 2004-266597 A | 9/2004 |
| JP | 2010-045591 A | 2/2010 |
| JP | 2015-177349 A | 10/2015 |

\* cited by examiner

*Primary Examiner* — Shahbaz Nazrul
(74) *Attorney, Agent, or Firm* — Canon U.S.A., INC. IP Division

(57) ABSTRACT

An image pickup device, an image pickup system, and a movable body that include a conductive line in which a potential changes in a direction opposite to a direction of a change in a potential of a control line used to perform a global electronic shutter operation.

15 Claims, 18 Drawing Sheets

FRONT VIEW

TOP VIEW

REAR VIEW

IMAGE PICKUP DEVICE, IMAGE PICKUP SYSTEM, AND MOVABLE BODY

BACKGROUND OF THE INVENTION

Field of the Invention

One disclosed aspect of the embodiments relates to an image pickup device, an image pickup system, and a movable body.

Description of the Related Art

In recent years, it has been proposed that, in an image pickup device using a CMOS sensor, a global electronic shutter operation, in which charge from a photoelectric conversion unit of a pixel is read at the same time in a plurality of pixels in a plurality of rows and columns. Japanese Patent Laid-Open No. 2015-177349 discloses an image pickup device including a pixel having a first holding unitholding unit for maintaining charge generated by a photoelectric conversion unit, and a second holding unitholding unit to which the charge maintained in the first holding unitholding unit is transferred. It is also disclosed that, in a global electronic shutter operation, the transfer of the charge from the photoelectric conversion unit to the first holding unitholding unit is performed at the same time in the pixels in the plurality of rows and columns.

Further, Japanese Patent Laid-Open No. 2010-045591 describes an image pickup device that suppresses propagation of a change in a potential of a certain control line that controls a pixel to another conductive line through a parasitic capacity between the certain conductive line and the another conductive line. More specifically, it is disclosed that, during a period that the potential of the certain control line changes in a first direction, the potential of a conductive line that supplies a power source voltage or another control line is changed in a direction opposite to the first direction.

There is a problem that a change in a potential of a control line that performs a global electronic shutter operation is propagated to another conductive line through a parasitic capacity between the control line and another conductive line.

SUMMARY OF THE INVENTION

One aspect of the embodiments provides an image pickup device, an image pickup system, and a movable body that suppress the propagation of the change in the potential of the control line that performs the global electronic shutter operation to another conductive line. The image pickup device includes a pixel including a photoelectric conversion unit, a discharge unit, a first transistor connected to the photoelectric conversion unit and the discharge unit, a first holding unit, a second transistor connected to the photoelectric conversion unit and the first holding unit, a second holding unit, and a third transistor connected to the second transistor and the second holding unit; a control line connected to a gate of one of the first transistor, the second transistor, and the third transistor; a conductive line; and a control unit configured to supply, to the control line, a control signal in which potential changes in a first direction and supply, to the conductive line, a signal in which potential changes in a second direction which is a direction opposite from the first direction. At least a part of a period that the potential of the control signal changes in the first direction overlaps with at least a part of a period that the potential of the signal changes in the second direction.

Further features of the disclosure will become apparent from the following description of exemplary embodiments (with reference to the attached drawings).

DESCRIPTION OF THE EMBODIMENTS

Hereinafter, with reference to the drawings, each embodiment will be described. It is noted that, in the following description, a transistor is described as an N-type transistor unless specifically noted. However, the embodiments described below are not limited to the N-type transistor and a P-type transistor may be used as appropriate. In such a case, potentials of a gate, a source, and drain of the transistor can be changed as appropriate according to the description of the embodiments. For example, in a case of a transistor, which is made to serve as a switch, a low level and a high level of potentials provided to the gate may be switched according to the description of the embodiments.

First Embodiment (Overall Configuration of Image Pickup Device)

Figure 1:
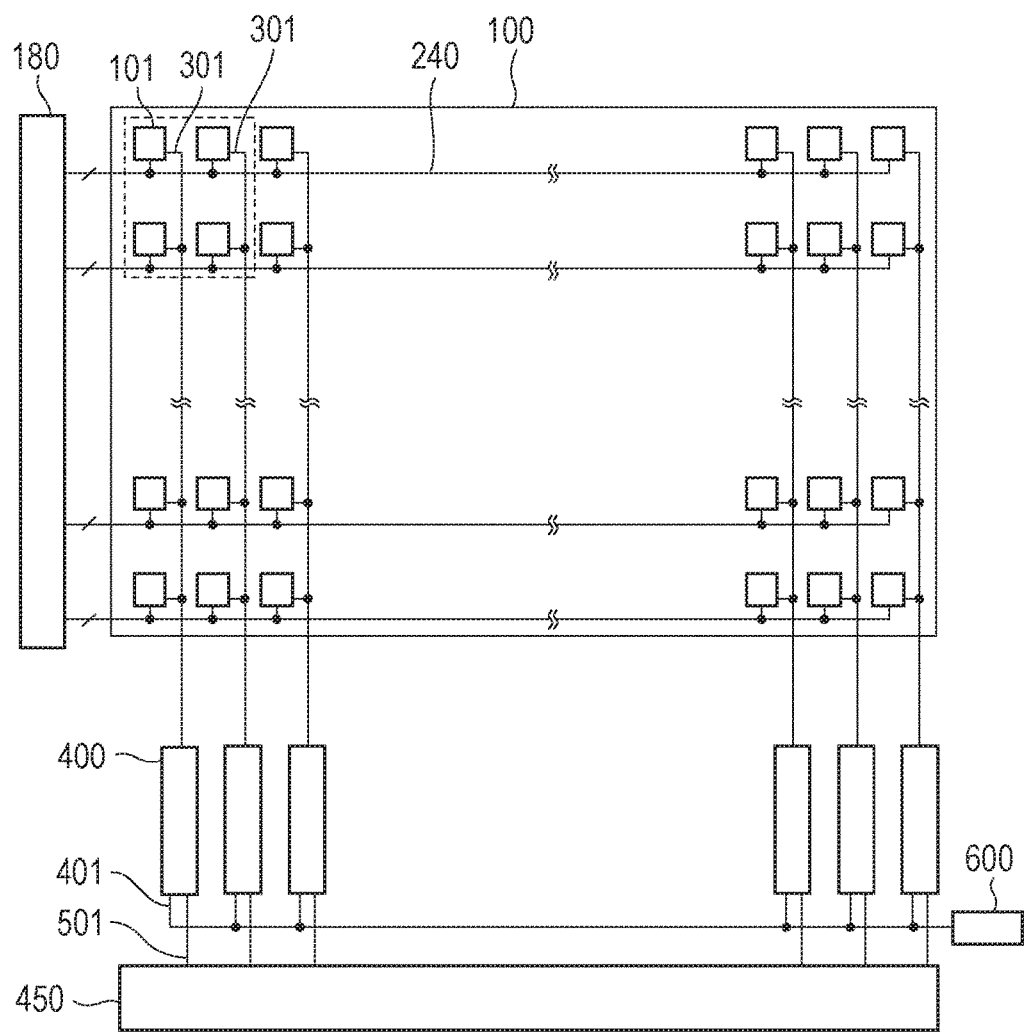
FIG. 1 is a diagram illustrating a configuration of an image pickup device.

FIG. 1 is a diagram illustrating a configuration of an image pickup device according to the present embodiment.

A pixel array 100 includes a plurality of pixels 101 arranged in a plurality of rows and columns.

A pixel drive unit 180 supplies a control signal to the plurality of pixels 101 via a control line group 240. The pixel drive unit 180 is a control unit for controlling operation of the pixels 101 with the control signal output to the control line group 240. The control signal controls a beginning and an ending of charge accumulation by photoelectric conversion in the pixels 101, resetting a later described pixel output unit, operating to transfer charge, and outputting signals to each row of the pixels 101 by the pixel output unit. The pixels in a same row in the pixel array 100 are connected to a signal processing unit 400 via a signal common output line 301. The pixels 101 in a row selected by the pixel drive unit 180 output pixel signals to the common output line 301 of a corresponding column. The signal processing unit 400, for example, has a function to amplify the pixel signals. The pixel signals processed in the signal processing unit 400 are selected by a horizontal scan unit 450 via a selection signal 501 and transferred to a signal output unit 600 via a common output line 401. As the horizontal scan unit 450, a decoder or a shift register may be used. The signal output unit 600 may further include a function for amplifying the pixel signals. Further, in a case where the signal processing unit 400 includes an analog-digital converter (hereinafter referred to as an A/D converter), the pixel signals are output, as digital signals, to the common output line 401 and signal output unit 600. In this case, the signal output unit 600 may include a digital signal processing function. As the digital signal processing function, there are a function for applying digital gain, an offset adding function, a function for adding or subtracting plural pixel signals, and a function for subtracting a noise element from the pixel signals. The pixel signals, on which various signal processing is performed, are output outside the image pickup device via the signal output unit 600. As the output configuration, the signal output unit 600 includes, for example, an output method using a system for outputting voltage from a single terminal such as a buffer circuit or a system with an LVDS (low voltage differential signaling) including a couple of differential terminals.

It is noted that the image pickup device illustrated in FIG. 1 is formed on a single semiconductor substrate.

Figure 2:
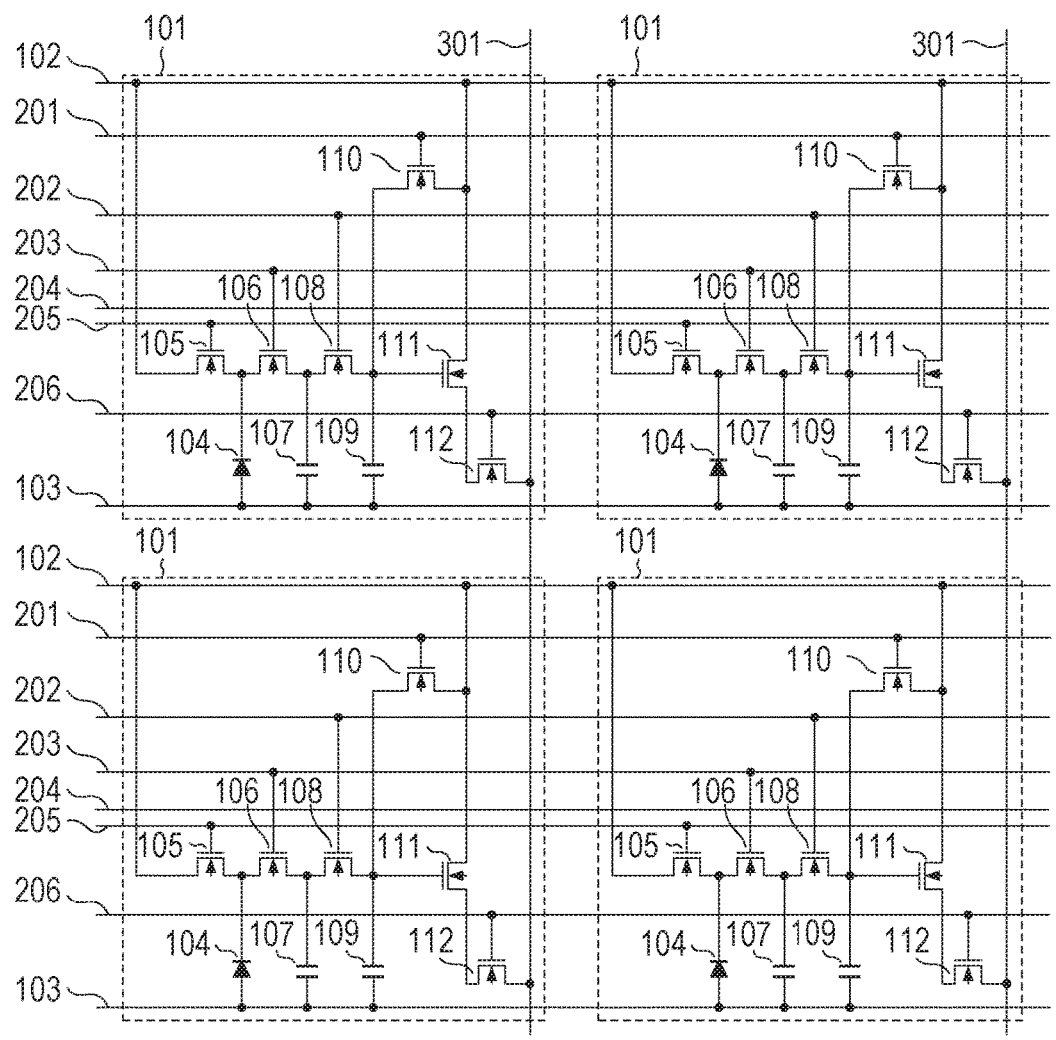
FIG. 2 is a diagram illustrating an equivalent circuit of a pixel.

FIG. 2 is an equivalent circuit diagram of the pixel 101 illustrated in FIG. 1. In FIG. 2, an area in the two rows and two columns of the pixels 101 illustrated in FIG. 1 is extracted and illustrated.

The pixel 101 includes a power supply line 102, a grounding line 103, a photoelectric conversion unit 104, a first transfer transistor 105, a second transfer transistor 106, and a third transfer transistor 108. Further, the pixel 101 includes a first holding unit 107, a second holding unit 109, a reset transistor 110, an amplification unit 111, and a selection transistor 112. As the first transfer transistor 105, the second transfer transistor 106, the third transfer transistor 108, the reset transistor 110, the amplification unit 111, and the selection transistor 112, generally, a MOS transistor may be used.

The control lines 201 to 206 are conductive lines included in the control line group 240 of FIG. 1. The control lines 201, 202, and 206 transmit control signals used to control each row of the pixel 101. The control lines 203 and 205 transmit control signals used to integrally control the plurality of pixel 101 arranged in a plurality of columns and rows. The plurality of pixels 101 arranged in the plurality of columns and rows, which are integrally controlled, are typically the all pixels 101 included in the pixel array 100 illustrated in FIG. 1. The control line 204 is a conductive line for transmitting a signal in a phase opposite to the signals output to the control line 205. In other words, it means, when the potential of the control line 205 changes in a first direction in a certain period, the potential of the control line 204 changes to a second direction which is opposite to the first direction.

The power supply line 102 and the grounding line 103 are omitted in the FIG. 1. The power supply line 102 and the grounding line 103 are commonly connected to the plurality of pixels 101 arranged in the plurality of rows and columns.

The photoelectric conversion unit 104 accumulates charge which is generated by incident light. The photoelectric conversion unit 104 is generally a photodiode. Another example of the photoelectric conversion unit 104 is a photoelectric conversion film.

The first transfer transistor 105 is connected to the control line 205. The first transfer transistor 105 is a switch that switches on and off states according to the potential of the control line 205. When the first transfer transistor 105 is turned on, the potential of the photoelectric conversion unit 104 is reset to a potential corresponding to the potential of the power supply line 102. The power supply line 102 is a discharge unit to which charge accumulated in the photoelectric conversion unit 104 is discharged.

The second transfer transistor 106 is connected to the control line 203. The second transfer transistor 106 is a switch that switches on and off states according to the potential of the control line 203. When the second transfer transistor 106 is turned on, the charge accumulated by the photoelectric conversion unit 104 is transferred to the first holding unit 107.

The third transfer transistor 108 is connected to the control line 202. The third transfer transistor 108 is a switch that switches on and off states according to the potential of the control line 202. When the third transfer transistor 108 is turned on, the charge maintained in the first holding unit 107 is transferred to the second holding unit 109. The second holding unit 109 is generally a floating diffusion including an impurity diffusion layer formed in a semiconductor region of the pixel 101, a conductive line that connects the impurity diffusion layer and a gate of the amplification unit 111, and a parasitic capacity being parasitic in the gate of the amplification unit 111.

The amplification unit 111 is connected to the second holding unit 109, the reset transistor 110, the selection transistor 112, and the power supply line 102. The amplification unit 111 outputs a signal corresponding to the potential of the second holding unit 109 to the selection transistor 112.

The selection transistor 112 is connected to the control line 206. The selection transistor 112 is a switch that switches on and off states according to the potential of the control line 206. To the common output line 301, an unillustrated current source is connected. When the selection transistor 112 is turned on, the current that the current source supplies is provided to the amplification unit 111. With a power source voltage provided from the power supply line 102, the current source, and the amplification unit 111, a source follower circuit is formed. With this configuration, signals corresponding to the potential of the second holding unit 109 are output from the source of the amplification unit 111. In this manner, when the selection transistor 112 is turned on, the signals output from the amplification unit 111 are output to the common output line 301.

Figure 3:
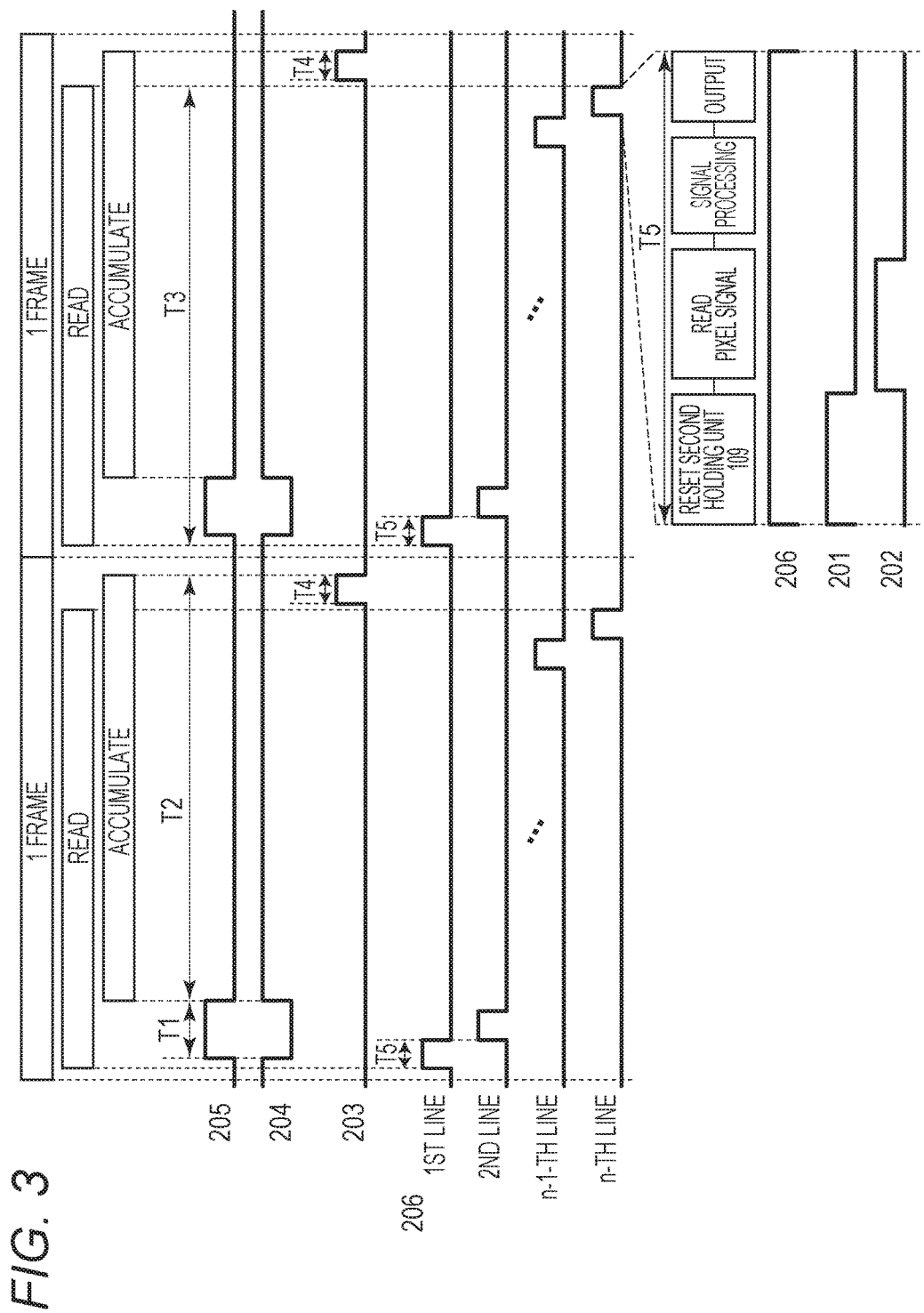
FIG. 3 is a diagram illustrating an operation of the pixel.

FIG. 3 is a timing diagram illustrating operation of the pixels 101 illustrated in FIG. 2. The reference numerals illustrated in FIG. 3 correspond to the reference numerals in FIG. 2, respectively. Here, each switch is turned on during a period that pulse is in a high level (hereinafter, referred to as HIGH) and is turned off during a period that pulse is in a low level (hereinafter, referred to as LOW). It is noted that the unit of the period T is [SEC]; however, the unit is omitted in the drawings and the following description.

(Timings to Start Charge Accumulation Period and Reset Period in Photoelectric Conversion Unit 104)

During the period T1, the pixel drive unit 180 makes the potential of the control line 205 to be HIGH. With this configuration, during the period T1, the first transfer transistor 105 is turned on and the photoelectric conversion unit 104 is reset so as to have a potential corresponding to the potential of the power supply line 102. When the period T1 ends, the pixel drive unit 180 makes the potential of the control line 205 to be LOW. As a result, the first transfer transistor 105 is turned off. This causes that the reset of the photoelectric conversion unit 104 is canceled. The photoelectric conversion unit 104 receives light. In response to that the first transfer transistor 105 is turned off, the photoelectric conversion unit 104 starts a charge accumulation operation (start timing of Period T2).

(Charge Accumulation Period of Photoelectric Conversion Unit 104)

The photoelectric conversion unit 104 accumulates charge, which is generated based on incident light, during the period T2.

(End of First Transfer Period in which Charge of Photoelectric Conversion Unit 104 is Transferred to First Holding Unit 107 and Charge Accumulation Period)

During the period T4, the pixel drive unit 180 makes the potential of the control line 203 to be HIGH. As a result, during the period T4, the second transfer transistor 106 is turned on. Thus, a first transfer period, in which the charge accumulated in the photoelectric conversion unit 104 is transferred to the first holding unit 107, starts. When the period T3 ends, the pixel drive unit 180 makes the potential of the control line 203 to be LOW. This turns off the second transfer transistor 106. As a result, the first transfer period, in which the charge is transferred from the photoelectric conversion unit 104 to the first holding unit, ends. Further, the period T2, which is a charge accumulation period of the photoelectric conversion unit 104 also ends. The photoelectric conversion unit 104 accumulates charge after the period T2, this charge is not transferred to the first holding unit 107 and is discharged to the power supply line 102 as the photoelectric conversion unit 104 is reset. Thus, the charge that the photoelectric conversion unit 104 accumulates after the period T2 does not affect an image which is generated by using signals output from the image pickup device. Thus, the end of the charge accumulation period of the photoelectric conversion unit 104 is at the end timing of the period T4.

As described above, each of the control lines 203, 204, and 205 transmits a signal that integrally control the plurality of pixels 101 which are arranged in a plurality of rows and columns. Thus, the start of the charge accumulation period of the photoelectric conversion unit 104 is the same timing in the plurality of pixels 101 arranged in a plurality of rows and columns. The end of the charge accumulation period of the photoelectric conversion unit 104 is the same in the plurality of pixels 101 arranged in the plurality of rows and columns. In this manner, the image pickup device according to the present embodiment can perform a global shutter operation.

(Sequential Reading of Signals from Pixels 101 in Each Row)

In the period T5 following the period T4, the pixel drive unit 180 makes the potential of the control line 206 output to the pixel 101 of the first row to be HIGH. As a result, the selection transistor 112 of the pixel 101 of the first line is turned on. Thus, the amplification unit 111 of the pixel 101 of the first row outputs a signal to the common output line 301.

In addition, the period T5 will be described. Regarding the part of the period T5 of the n-th line, further detailed description is given. The pixel drive unit 180 makes the potential of the control line 201 in a target row used to read the pixel signals to be HIGH. As a result, the reset transistor 110 is turned on. Thus, the second holding unit 109 is reset so as to have a potential corresponding to the power supply line 102. After that, the pixel drive unit 180 makes the potential of the control line 201 of a target row used to read the pixel signals to be LOW. As a result, the reset transistor 110 is turned off. Thus, the reset of the second holding unit 109 is canceled. Although detailed description is omitted in the present embodiment, signals (noise signals) output from the amplification unit 111 may be read corresponding to the potential of the second holding unit 109 in which reset is canceled. With this, a correlated double sampling (CDS) operation for subtracting noise signals from a signal, which is later read and based on the charge, can be performed.

After that, the pixel drive unit 180 makes the potential of the control line 202 in a target row used to read the pixel signals to be HIGH. With this, a second transfer period, in which charge maintained in the first holding unit 107 is transferred to the second holding unit 109, is started. After that, the pixel drive unit 180 makes the potential of the control line 202 in the target row used to read pixel signals to be LOW. With this, the second transfer period, in which the charge maintained in the first holding unit 107 is transferred to the second holding unit 109, ends.

At this timing, the amplification unit 111 outputs a pixel signal (a photoelectric conversion signal) corresponding to the potential of the second holding unit 109 to which the charge, which is accumulated the photoelectric conversion unit 104 during the charge accumulation period, is transferred.

(Signal Processing by Signal Processing Unit 400 and Output to Outside Image Pickup Device)

On the pixel signals output to the common output line 301, the above described signal processing is performed in the signal processing unit 400. This signal processing may be, for example, a CDS process, amplification, analog-digital conversion, addition and subtraction of pixel signals, averaging processing, and the like.

After that, the signal processing unit 400 in a column selected by the horizontal scan unit 450 outputs the pixel signal processed in the signal output unit 600.

After performing the above described signal processing, the signal output unit 600 outputs the processed pixel signals outside the image pickup device.

(Conductive Line Layout in Pixel 101)

Next, with reference to FIGS. 4 to 7, a layout, which is particularly related to the control line group 240 and the common output line 301, in the layout configuration of the pixels 101 of FIG. 2 will be described. Thus, in FIGS. 4 to 7, the first transfer transistor 105, the second transfer transistor 106, the third transfer transistor 108, the first holding unit 107, the second holding unit 109, the reset transistor 110, the amplification unit 111, and the selection transistor 112 are omitted. Further, according to the present embodiment, the conductive lines are arranged by using a plurality of wiring layers as illustrated in FIG. 7. Here, FIG. 7 is a diagram illustrating a section structure along the cross-section line 208 indicated respectively in FIGS. 4 to 6.

Although details will be described later, in the description of FIGS. 4 to 6, the description is given with reference to FIG. 7 according to need.

Figure 4:
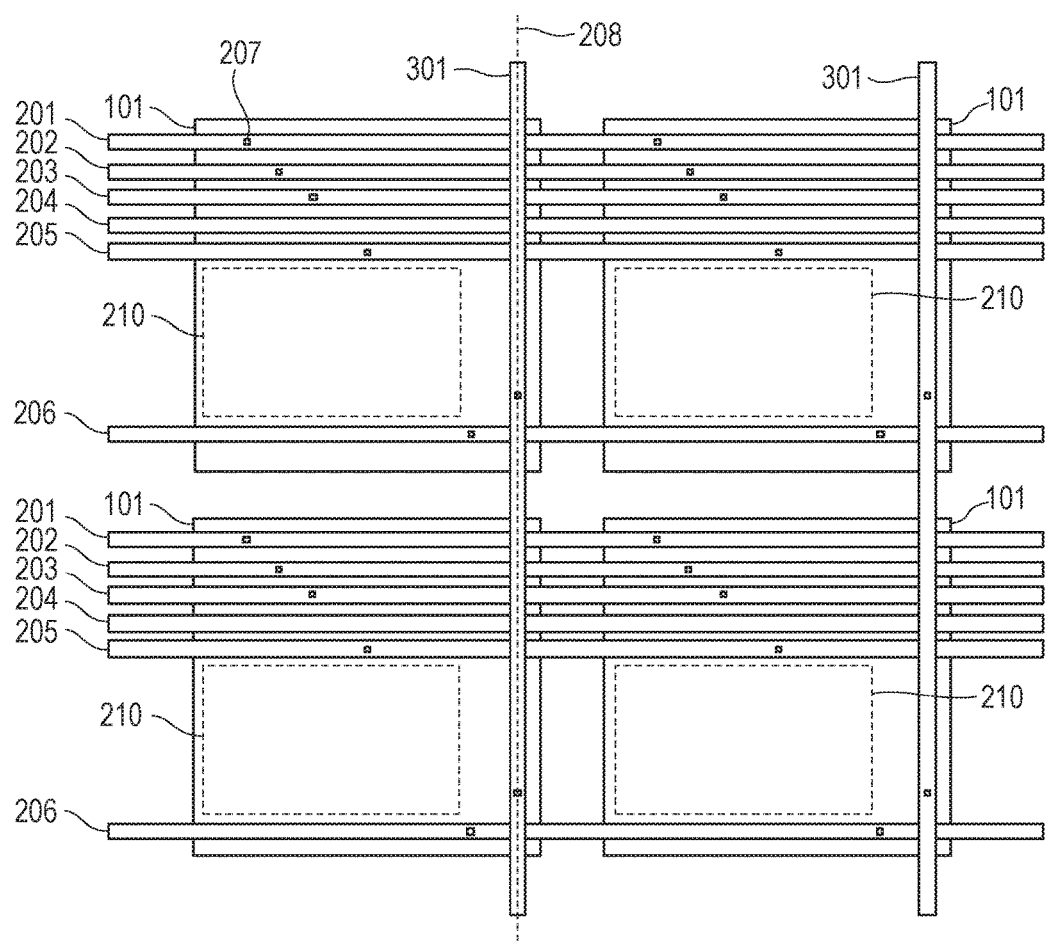
FIG. 4 is a diagram illustrating a conductive line layout of the pixel.

FIG. 4 is a diagram illustrating a layout of the common output line 301. To simplify the description of the arrangement, the control lines 201 to 205 are also illustrated. As illustrated in FIG. 7, the control lines 201 to 204 are arranged in a same wiring layer, and the common output line 301 is arranged in a wiring layer, which is different from the wiring layer in which the control lines 201 to 204 are arranged.

The respective control lines 201 to 204 are connected to a gate of a corresponding switch by contact units 207. An opening 210 is an area under which the photoelectric conversion unit 104 is provided and conductive lines are not arranged.

Figure 5:
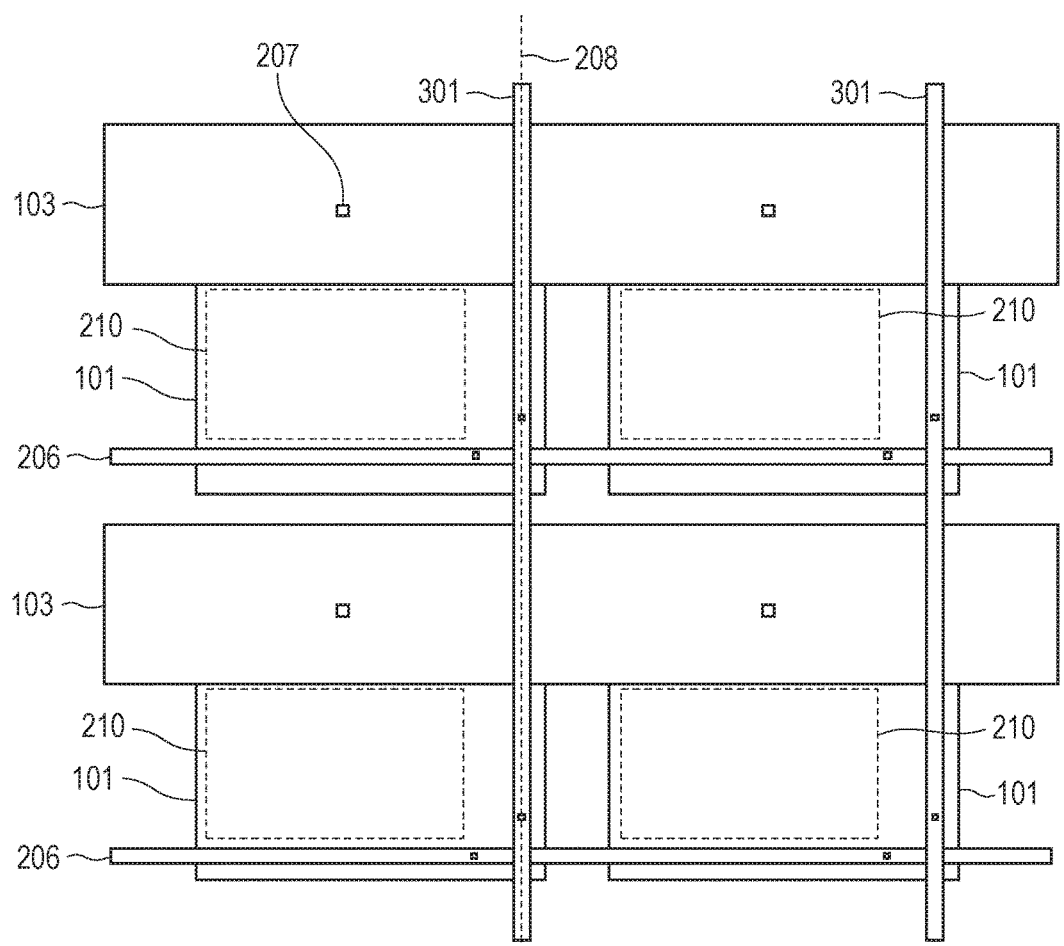
FIG. 5 is a diagram illustrating a conductive line layout of the pixel.

FIG. 5 is a diagram illustrating a layout of the grounding line 103. As illustrated in FIG. 7, the grounding line 103 is provided in a wiring layer placed above the wiring layer where the control lines 201 to 205 are provided. Via the contact unit 207 of FIG. 5, the grounding line 103 is connected to the first holding unit 107 and the second holding unit 109. Further, although it is not illustrated, there is further included a contact unit, which has a conductivity type opposite to the semiconductor region that the charge of the photoelectric conversion unit 104 is accumulated and is connected to a well formed across a plurality of pixels 101.

Figure 6:
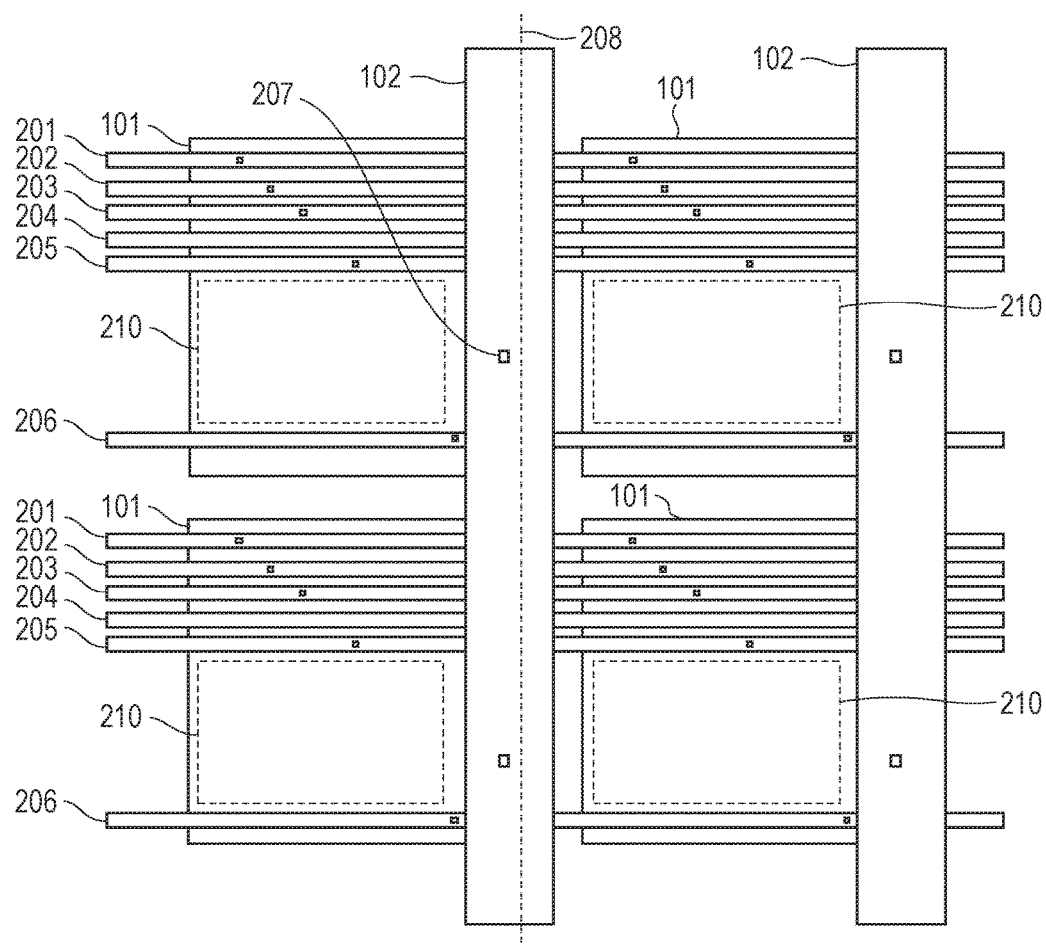
FIG. 6 is a diagram illustrating a conductive line layout of the pixel.
Figure 7:
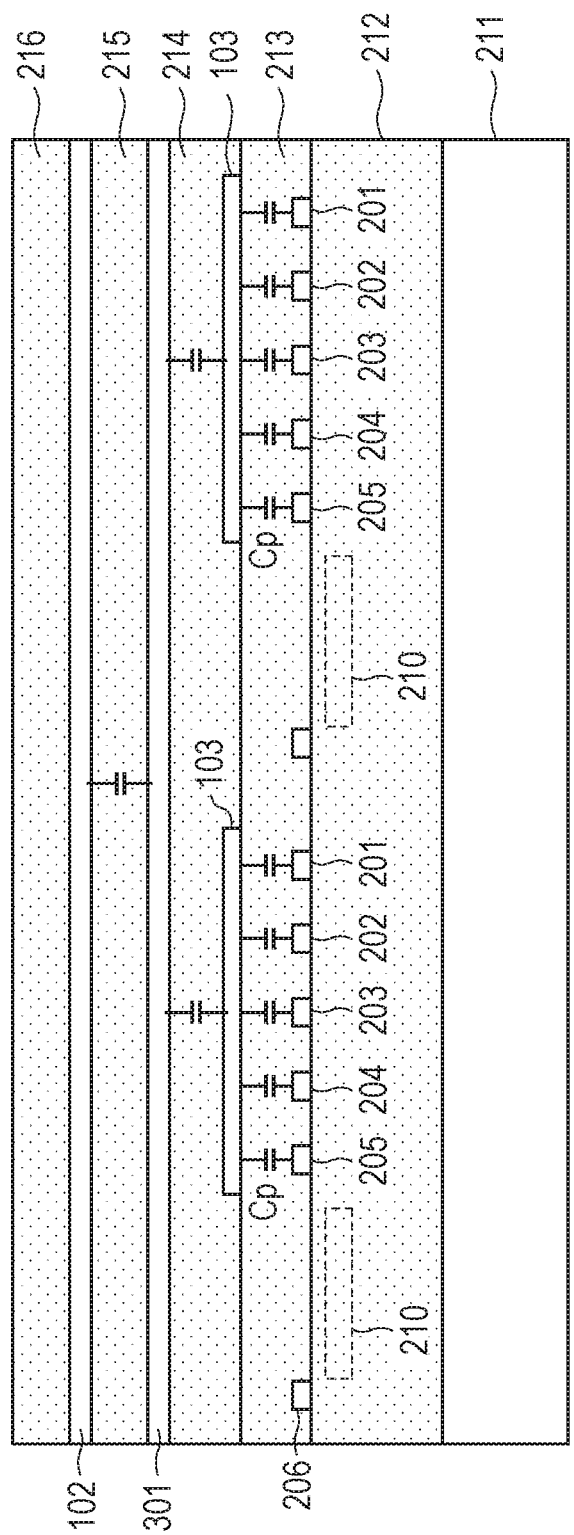
FIG. 7 is a diagram illustrating a conductive line layout of the pixel.

FIG. 6 is a diagram illustrating a layout of the power supply line 102. To simplify the arrangements, the control lines 201 to 205 are also illustrated. As illustrated in FIG. 7, the power supply line 102 is provided in a wiring layer above the wiring layer in which the control lines 201 to 205 are provided, the wiring layer in which the grounding line 103 is provided, and the wiring layer in which the common output line 301 is provided. The power supply line 102 is connected to the reset transistor 110 and the amplification unit 111 via the contact unit 207.

FIG. 7 is a diagram illustrating a section structure along the cross-section line 208 illustrated in FIG. 4. In the semiconductor region 211, the unillustrated first transfer transistor 105, the second transfer transistor 106, the third transfer transistor 108, the first holding unit 107, the second holding unit 109, the reset transistor 110, the amplification unit 111, and the selection transistor 112 are provided. Further, FIG. 7 illustrates a parasitic capacity Cp between the conductive lines provided in different wiring layers respectively. In actual, although parasitic capacities occur between the conductive lines provided in a same wiring layer, those parasitic capacities are not illustrated in FIG. 7.

Between the semiconductor region 211 and the wiring layer in which the control lines 201 to 205 are provided, an insulating layer 212 is provided.

Between the wiring layer in which the control lines 201 to 205 are provided and the wiring layer in which the grounding line 103 is provided, an insulating layer 213 is provided.

Between the wiring layer in which the grounding line 103 is provided and the wiring layer in which the common output line 301 is provided, an insulating layer 214 is provided.

Between the wiring layer in which the common output line 301 is provided and the wiring layer in which the power supply line 102 is provided, an insulating layer 215 is provided.

Above the wiring layer in which the power supply line 102 is provided, an insulating layer 216 is provided.

Although it is not illustrated, above the insulating layer 216, a single micro lens is provided corresponding to the single pixel 101 illustrated in FIG. 1. A color filter may be provided between the micro lens and the insulating layer 216. Further, an interlayer lens may be further included between the insulating layer 216 and the color filter.

(Propagation of Potential Change in Control Line for Performing Global Electronic Shutter Operation, to an Another Line)

With reference to FIGS. 3 and 7, an affect to an image quality by the global electronic shutter operation will be described.

At the beginning of the period T1 of FIG. 3, the first transfer transistor 105 is turned on in all the pixels 101 provided in the pixel array 100. In other words, the potentials of the control lines 205 in all rows change from LOW to HIGH. This potential change is propagated, corresponding to the ratio of each parasitic capacity, to the grounding line 103, the common output line 301, and the power supply line 102 respectively, through the parasitic capacity Cp. With this configuration, a transitional potential change occurs in the grounding line 103, the common output line 301, and the power supply line 102.

Further, at the end of the period T1 in FIG. 3, the first transfer transistor 105 is turned off in all the pixels 101 provided in the pixel array 100. In other words, potentials of the control line 205 in all rows change from HIGH to LOW. This potential change is propagated, corresponding to the ratio of each parasitic capacity, to the grounding line 103, the common output line 301, and the power supply line 102 respectively, through the parasitic capacity Cp. With this configuration, a transitional potential change occurs in the grounding line 103, the common output line 301, and the power supply line 102.

In this manner, at the beginning and end of the period T1 respectively, a transitional potential change occurs in the grounding line 103, the common output line 301, and the power supply line 102. The potential changes in each conductive line may cause changes in potentials of each terminal of the drain, source, and backgate of the amplification unit 111. The potential change of the amplification unit 111 may cause a change in the potential of the common output line 301 when the amplification unit 111 outputs pixel signals.

At least one of the beginning and end of the period T1 may sometimes overlap with the period T3 in which the pixel signals are being read from the pixel 101 in one row. In this case, a change in the potential of the control line 205, and a transitional potential fluctuation in the grounding line 103, the common output line 301, and the power supply line 102 cause a change in the pixel signal being output to the common output line 301. Thus, the transitional potential changes in the grounding line 103, the common output line 301, and the power supply line 102 are superimposed to the pixel signals as noise.

Further, the transitional potential changes in the grounding line 103, the common output line 301, and the power supply line 102 may sometimes overlap with the period to read the pixels 101 in a plurality of rows. In this case, to the pixel signals respectively output from the pixels 101 in the plurality of rows, noise due to the transitional potential changes in the grounding line 103, the common output line 301, and the power supply line 102 is superimposed. When an image is generated by using the signals output from the image pickup device, the image quality is reduced since lines as lateral stripes caused by the noise are generated on the image. Particularly, since these lines as lateral stripes are easily and visually recognized, it is required to suppress the image deterioration.

To solve this problem, it may be considered to set the beginning and end of the period T1 not to overlap with the period T3; however, this may cause a reduction of a frame rate. Further, when a period to wait until the transitional potential changes in the grounding line 103, the common output line 301, and the power supply line 102 ends, this causes further reduction of the frame rate. Further, from another point of view, when the beginning and end of the period T1 are not set during the period T3, there may be more restriction of setting the charge accumulation period of the photoelectric conversion unit 104. For example, the length of the charge accumulation period of the photoelectric conversion unit 104 may not be set longer than a predetermined period of time. When the predetermined period of time is short, continuousness of a subject of a plurality of sequential frames is reduced. For example, when a movie is being captured, motion of the subject is discontinuous, and the quality of the movie is reduced. In this manner, an inventor found that there is an object to suppress the image quality reduction due to a global shutter operation without increasing restriction of the timings of the periods T1 and T3.

According to the present embodiment, as illustrated in FIG. 4, the control line 204 is placed in parallel with and next to the control line 205.

The pixel drive unit 180 controls the potential of the control line 204 to be in a phase opposite to the potential of the control line 205 as illustrated in FIG. 3. In other words, the transitional potential changes in the power supply line 102, the grounding line 103, and the common output line 301 due to the change in the potential of the control line 205 is canceled because of the change in the potential in the opposite phase by the control line 204. The change in the potential of the common output line 301 during the reading time can be suppressed. Here, the control line 204 does not always have to be next to the control line 205 as long as the control line 204 is placed so that the parasitic capacities Cp of the control line 205 and each conductive line become equivalent.

Figure 8:
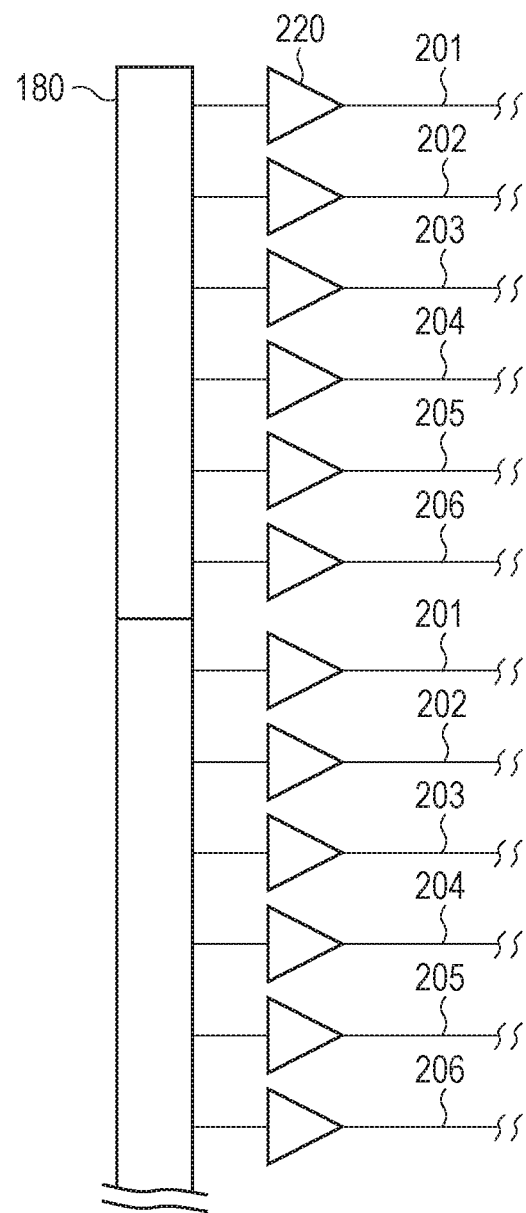
FIG. 8 is a diagram illustrating a circuit that drives a control line.
Figure 9:
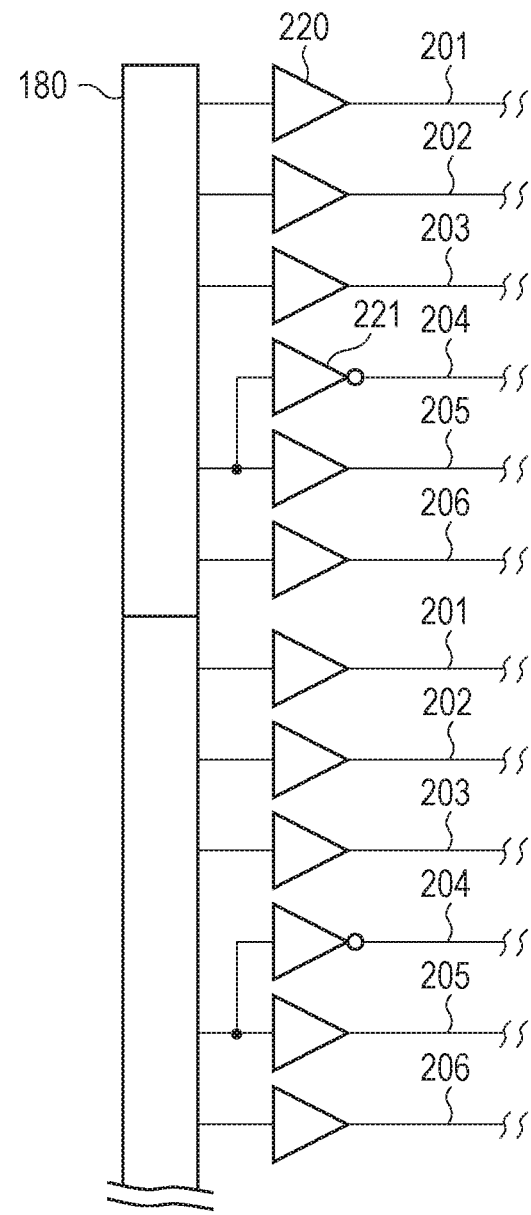
FIG. 9 is a diagram illustrating a circuit that drives the control line.

FIGS. 8 and 9 illustrate configuration examples of a signal generation/supply unit of the control line group 240. A signal generated in the pixel drive unit 180 is provided via a common conductive line of each row by the buffer circuit 220. The control signal of the control line 204 are generated by the pixel drive unit 180 in FIG. 8. As another example, as illustrated in FIG. 9, the inverter circuit 221 may generate and provide control signals of the control line 204 outside the pixel drive unit 180.

As illustrated in FIG. 2, when the control line 204 is not connected to an element included in the pixel 101, load of the buffer circuit 220 that drives the control line 204 is lighter, compared to the control line 205. Thus, when being further away from the pixel drive unit 180, there may be a case where a reverse phase relationship between the control line 204 and the control line 205 is not maintained. In this case, in an area where the reverse phase relationship between the control line 204 and the control line 205 is not being maintained, the restriction of the transitional potential changes in the in the power supply line 102, the grounding line 103, and the common output line 301 due to the potential change in the control line 205 may not be sufficient. In this case, there may be provided a configuration that the inverter circuits 221 are provided with intervals of arbitrary number of columns in the pixel array 100. By adjusting a delay amount by the inverter circuit 221, the reverse phase relationship between the control line 204 and the control line 205 can be maintained.

Figure 10:
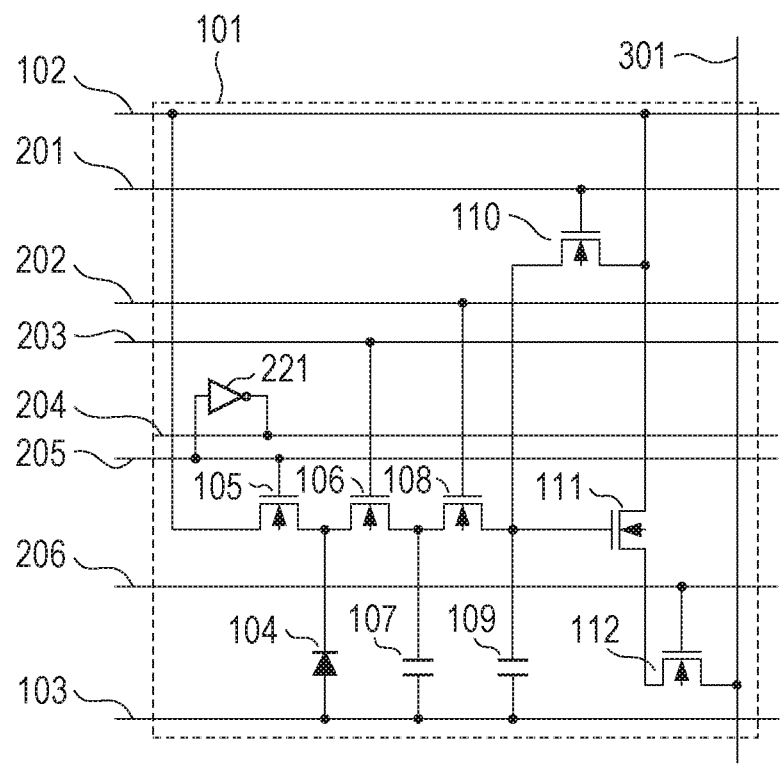
FIG. 10 is a diagram illustrating the equivalent circuit of the pixel.

Further, as another example, as illustrated in FIG. 10, the inverter circuit 221 is provided inside a single pixel 101. The inverter circuit 221 generates signals in a reverse phase with respect to the control signals of the control line 205 and supplies the signals to the control line 204. In this case, the control line 204 is provided independently in the respective plural pixels 101. With this configuration, in all the pixel 101 in the pixel array 100, the reverse phase relationship between the control line 205 and the control line 204 can be maintained.

FIG. 10 illustrates an example that a single pixel 101 includes a single inverter circuit 221 and a single control line 204. In this example, by providing the inverter circuit 221 in each pixel 101, an increase of a circuit size, an increase of a power consumption, and an increase of noise caused by the inverter circuit 221 may be caused. As another example, the control line 204 may be provided across a plurality of pixels 101, the inverter circuit 221 provided in a single pixel 101 may supply control signals to the control line 204 which is provided across the plurality of pixels 101. For example, there is an example that the plurality of pixels 101 in the pixel array 100 are divided into blocks, the control line 204 is provided across the plurality of pixels 101 within one block, and the inverter circuit 221 which supplies control signals to the control line 204 is provided inside the pixel 101. The pixels 101 included in the single block may include the pixel 101 which is provided in a plurality of columns in an only single row. Further, the pixels 101 included in one block is a part of the pixel array 100 may include pixel 101 which is provided in a plurality of rows and columns.

Here, the inside of the pixel 101 may be considered to be an inside of an isolation region (an element isolation region), which electrically isolates the plurality of pixels 101 from one another. This isolation region may be formed by a shallow trench isolation (STI) method or a deep trench isolation (DTI) method, for example. Further, as another method for forming the element isolation region, a local oxidation of silicon (LOCOS) method may be used.

As described above, according to the present embodiment, a control line 204, to which a control signal in a phase reverse from the control signal supplied to the control line 205 is supplied, is provided. This configuration can suppress the transitional potential change in the grounding line 103, the common output line 301, and the power supply line 102, which caused by a change in the potential of the control line 205. This configuration can suppress deterioration of an image quality caused by a change in the potential of the control line 205.

Here, according to the present embodiment, the pixel signals are read from the pixel 101 row by row. However, this example does not set any limitation. For example, a plurality of common output lines 301 may be provided to the pixels 101 in one row. In addition, during a period that the pixel signals from the pixels 101 in one row are output to one of the plurality of common output lines 301, the pixel signals from the pixels 101 in a different row may be output to another one of the plurality of common output line 301.

Further, according to the present embodiment, the pixel array 100 and the signal processing unit 400 are provided in one semiconductor substrate; however, this example does not set any limitation. For example, a semiconductor substrate including the pixel array 100 and a semiconductor substrate including the signal processing unit 400 may be layered. In this case, in addition to the embodiment in which the signal processing unit 400 is provided in each column of the pixels 101 in the pixel array 100, the signal processing unit 400 may be provided corresponding to the plurality of pixels 101 provided in a plurality of rows and columns, which are a part of the pixel array 100.

Further, the pixel 101 according to the present embodiment includes the selection transistor 112; however, this example does not set any limitation. As another example, there may be a manner that each pixel 101 does not include a selection transistor 112. In this case, the common output line 301 is connected to the source of the amplification unit 111. Further, the selection of a pixel row to output signals may be made by changing the potential provided to the drain of the reset transistor 110. In other words, to the unselected pixel row, which is a pixel row which does not output signals, the potential supplied to the drain of the reset transistor 110 is set to a potential (an off-potential) to turn off the amplification unit 111. Then, the pixel drive unit 180 turns on the reset transistor 110 and gives the off-potential to the second holding unit 109. With this configuration, the amplification unit 111, to which the off-potential is given, becomes in an off state. On the other hand, to the pixel row that outputs signals, the potential supplied to the drain of the reset transistor 110 is set to a potential (an on-potential) to turn on the amplification unit 111. Then, the pixel drive unit 180 turns on the reset transistor 110 and gives the on-potential to the second holding unit 109. With this configuration, the amplification unit 111, to which the on-potential is given, becomes in an on state and is able to output pixel signals to the common output line 301.

Here, the reset of the photoelectric conversion unit 104 is performed by using potential corresponding to the potential of the power supply line 102 according to the present embodiment; however, the reset may be performed by using unillustrated another potential. Further, according to the present embodiment, the first transfer transistor 105 is provided to reset the photoelectric conversion unit 104. As another example, the photoelectric conversion unit 104 may be reset by turning on the reset transistor 110 in a condition that the pixel drive unit 180 turns on the second transfer transistor 106 and the third transfer transistor 108.

Further, the first holding unit 107 and the second holding unit 109 may be provided with a configuration using a junction capacitance of a P-type and an N-type semiconductor regions or an MIM (Metal-Insulator-Metal) configuration in which a dielectric material is placed between a metal material. The present embodiment is not particularly limited to a configuration of capacitors of the first holding unit 107 and the second holding unit 109.

Further, the timing that the potential of the control line 205 changes and the timing that the potential of the control line 204 changes do not have to coincide with each other. For example, it is assumed that the potential of the control line 205 changes in a first direction for a certain period of time. The period that the potential of the control line 204 changes in a second direction which is opposite to the first direction needs to be overlapped with at least a part of the above period of time.

Second Embodiment

The image pickup device according to the present embodiment will be described focusing on a difference from the first embodiment.

Figure 11:
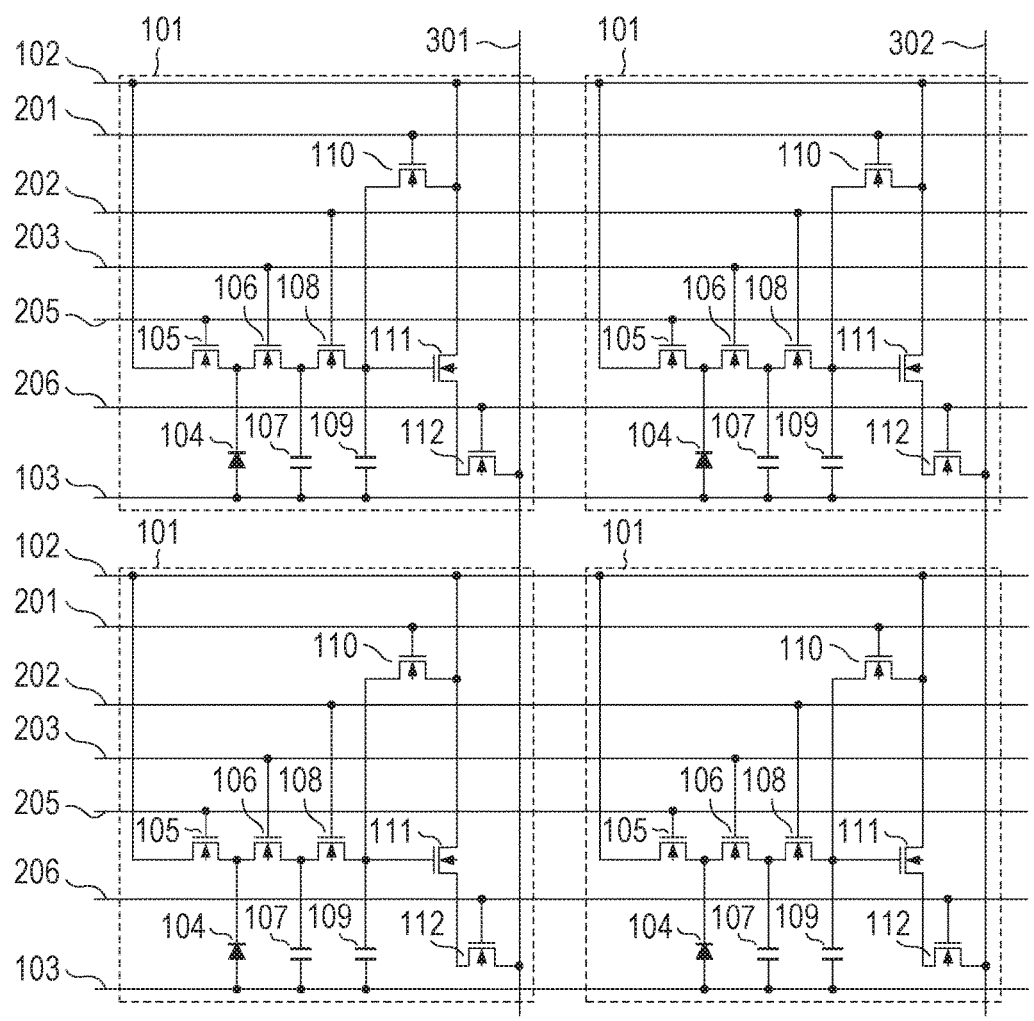
FIG. 11 is a diagram illustrating an equivalent circuit of a pixel.

FIG. 11 is a diagram illustrating an equivalent circuit of the pixel 101 according to the present embodiment. The difference from the pixel 101 described in the first embodiment is that the control line 204 is not provided. Further, the control by the control line 203 is different. In this embodiment, a difference from the first embodiment will be mainly described.

Figure 12:
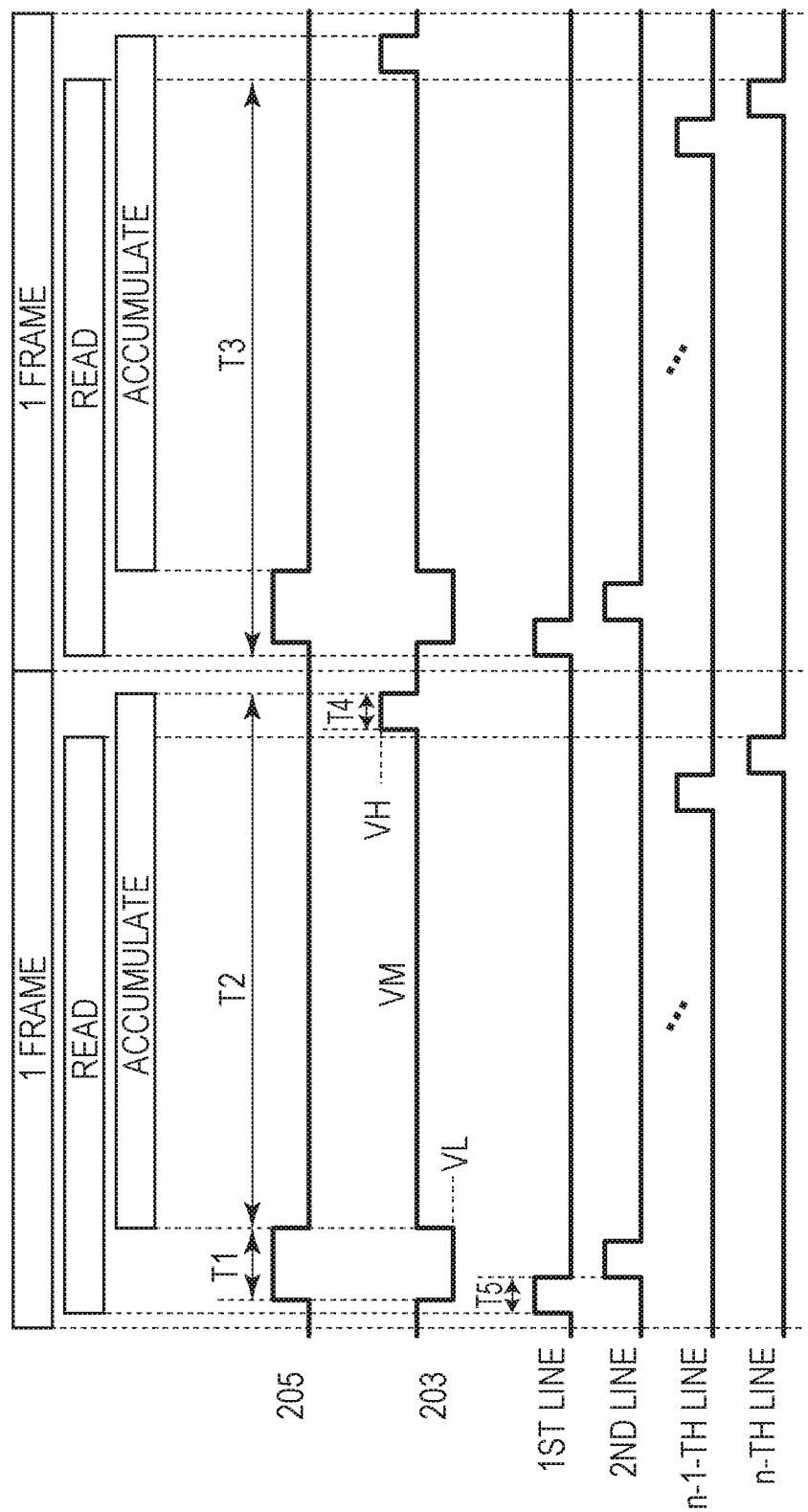
FIG. 12 is a diagram illustrating an operation of the pixel.

As illustrated in FIG. 12, the potential of the control line 203 is controlled by using three values of VL, VM, and VH. The control line 203 makes a change from VM to VL based on a change from LOW to HIGH made by the control line 205, and the control line 203 makes a change from VL to VM based on a change from HIGH to LOW made by the control line 205. The level of VM is set to a level that the second transfer transistor 106 is turned off, and the level of VH is set to a level that the second transfer transistor 106 is turned on. Setting of the VL is set according to a difference of levels of LOW and HIGH of the control line 205 so that the signals can be made to change in a phase reverse to the control line 205. VL is a second potential, VH is a third potential, VM is a first potential between the second potential and the third potential.

Also, according to the present embodiment, the control line 203 is provided in a wiring layer that is the wiring layer in which the control line 205 is provided, as described in the first embodiment with reference to FIGS. 4 to 7. Further, in the same manner as the control line 205, the control line 203 is a signal line controlled at the same time in all pixels 101 provided in the pixel array 100. Thus, the potential of the control line 203 can be in a phase reverse to the potential of the control line 205. With this configuration, a change in the potential in the power supply line 102, the grounding line 103, and the common output line 301 caused by a change in the potential of the control line 205 can be canceled by the change in the potential of the control line 203.

Thus, in the same manner with the first embodiment, the image pickup device according to the present embodiment can suppress the change in the potential of the common output line 301 caused by a change in the potential of the control line 205. Here, since a potential change is a change caused in a condition that the second transfer transistor 106 is being off during the period T1, in the control line 203, the pixel signals are hardly affected as illustrated in FIG. 12 even when the potential change from VM to VL occurs during the period T1. Further, the control is performed after reading rows in the period T4 and this does not cause noise. Further, the set value of VL does not need to always be equal to the difference of the levels of LOW and HIGH of the control line 205 and, for example, the parasitic capacity Cp may be adjusted to adjust variation by a capacity ratio.

As described above, according to the present embodiment, since the control line 203 is controlled by using three values, the reduction of the image quality caused by a global electronic shutter operation can be suppressed without providing the control line 204. Further, since the control line 204, which is included in the first embodiment, is not provided, an area of the opening 210 that leads light to the photoelectric conversion unit 104 can be made larger. Thus, compared to the image pickup device according to the first embodiment, the sensitivity can be improved.

Here, the present embodiment has described an example that the control line 203 is controlled by using three values. As another example, there may be a configuration that another control line, or the power supply line 102 and grounding line 103 are controlled by using plural potentials.

Further, the first holding unit 107 and second holding unit 109 may be made as junction capacitances including bonding portions of the P-type and N-type semiconductor regions. In this case, when light enters to the first holding unit 107 and the second holding unit 109, a charge is generated inside the first holding unit 107 and the second holding unit 109 by photoelectric conversion at bonding portions. In this case, when the first holding unit 107 and the second holding unit 109 already maintain charge of a previous frame, a pseudo signal is generated since charge corresponding to a different frame is mixed into the first holding unit 107 and the second holding unit 109. To suppress the generation of charge in the first holding unit 107 and the second holding unit 109, a light shielding film may be provided above the first holding unit 107 and the second holding unit 109. The light shielding film is generally made of metal. The metal light shielding film is provided, for example, between the semiconductor region 211 and the wiring layer 1 in which the control lines 201 to 206 are provided, in FIG. 7, via the insulating layer between the semiconductor region 211. The potential of a light shielding film is controlled to be in a phase reverse to the potential of the control line 205 as described in the present embodiment. In this manner, the change in the potential of the common output line 301 caused by a change in the potential of the control line 205 can also be suppressed.

Third Embodiment

A third embodiment will be described focusing on a difference from the first embodiment.

Figure 13:
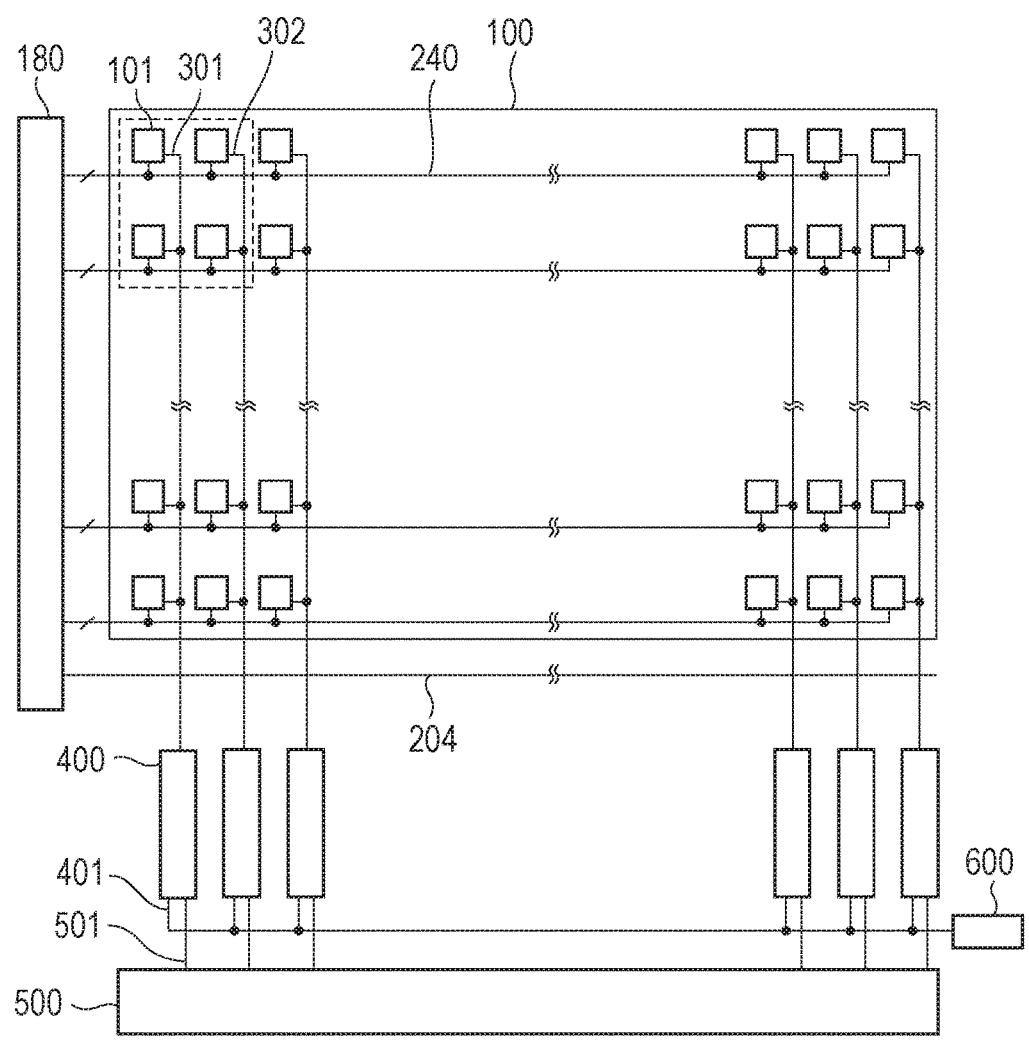
FIG. 13 is a diagram illustrating a configuration of an image pickup device.

FIG. 13 is a diagram that illustrates a configuration of an image pickup device according to the third embodiment as the disclosure. Compared to the first embodiment, the control line 204 is provided outside an area of the pixel array 100.

The area of the pixel array 100 will be described. The pixel array 100 includes a pixel 101, which is an effective pixel for outputting a pixel signal corresponding to an incident light, and an optical black pixel including a light-shield photoelectric conversion unit 104. Further, the pixel array 100 may include a dummy pixel including an amplification unit 111, without including the photoelectric conversion unit 104.

On the other hand, the signal processing unit 400 is provided in a peripheral circuit area. An intermediate area is provided between the peripheral circuit area and an area of the pixel array 100. The intermediate area is placed in a position closer to the peripheral circuit area than an edge of the pixel array 100, and an end of the intermediate area forms a border with the edge of the pixel array 100. Further, the intermediate area is placed closer to the pixel array 100 than an edge (an inner edge) of the peripheral circuit area and the other edge of the intermediate area forms a border with the peripheral circuit area. The edge of the pixel array 100 includes an edge of an active region of the semiconductor element that composes a pixel circuit of the pixel array 100, and an edge of the peripheral circuit area includes an edge of the active region of the semiconductor element that composes the peripheral circuit of the peripheral circuit area.

An end of the intermediate area includes an edge of the element isolation region, which is adjacent to the active region of the semiconductor element that composes the pixel circuit of the pixel array 100. The other end of the intermediate area includes an edge of the element isolation region, which is adjacent to the active region of the semiconductor element that composes the peripheral circuit of the peripheral circuit area.

Further, in the intermediate area, a common output line 301 that connects the pixel 101 provided in the pixel array 100 and the signal processing unit 400 provided in the peripheral circuit area. Further, in the intermediate area, a dummy material, which is not a component of the pixel array 100 or the circuit of the peripheral circuit area, is provided. The dummy material is a circuit similar to the amplification unit 111 for example. The dummy material does not output a signal to the common output line 301. Further, in the intermediate area, for example, a conductive member (a contact unit such as a contact plug) for applying a reference potential to the well of the pixel 101 is provided.

The control line 204 according to the present embodiment is provided in the intermediate area placed between the pixel array 100 and the peripheral circuit area.

Figure 14:
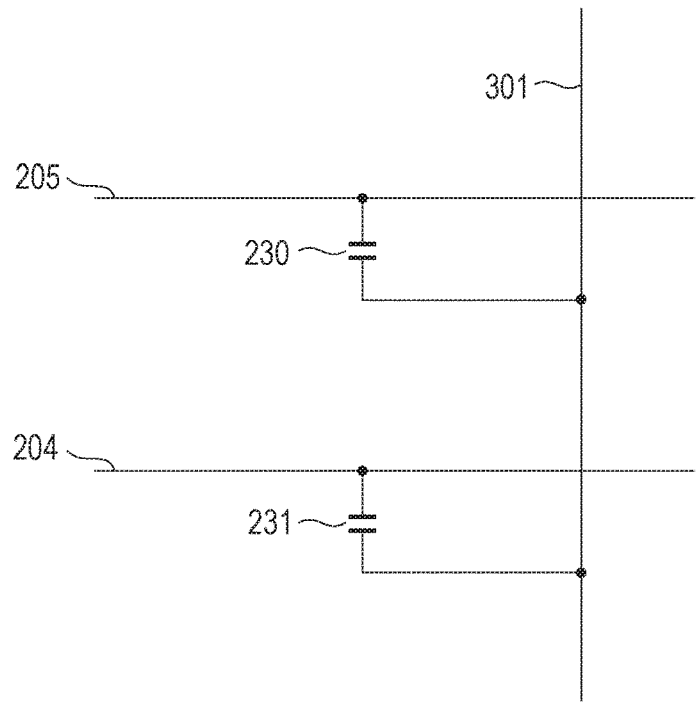
FIG. 14 is a schematic view of a parasitic capacity between a control line and a common output line.

FIG. 14 is a diagram schematically illustrating the common output line 301 and parasitic capacities between the control line 205 and the control line 204 as a single capacity, while omitting the connection relation of the parasitic capacity between the respective wiring layers. A change in the common output line 301 caused by a change in the potential of the control line 205 can be calculated based on a capacity 230 which is a parasitic capacity between the control line 205 and the common output line 301 and a potential difference between LOW and HIGH of the control line 205. As described in the present embodiment, the capacity 231 between the control line 204 and the common output line 301 and the potential difference between LOW and HIGH of the control line 204 are adjusted, even when the control line 204 is provided outside the region of the pixel array 100. This suppress an occurrence of the changes in the common output line 301 caused by the change in the potential of the control line 205.

Here, the present embodiment describes an arrangement example of the control line 204 to describe the difference from the first embodiment. As another example, there may be a configuration that a control unit, which is different from the pixel drive unit 180, and conductive line are provided to control.

Further, according to the present embodiment, the control line 204 is provided in the intermediate area; however, the control line 204 may be provided in the peripheral circuit area. It is noted that, compared to the peripheral circuit area, in the intermediate area, the control line 204 is easily made in a wiring pattern similar to the wiring pattern of the control line 205. This makes easier to set the capacity value of the parasitic capacity 231 and the capacity value of the parasitic capacity 230 equivalent.

As described above, the present embodiment can suppress a change in the potential of the common output line 301 caused by a change in the potential of the control line 205 by using the conductive line provided outside the pixel array 100.

Fourth Embodiment

The present embodiment will be described as focusing on a difference from the first embodiment.

Figure 15:
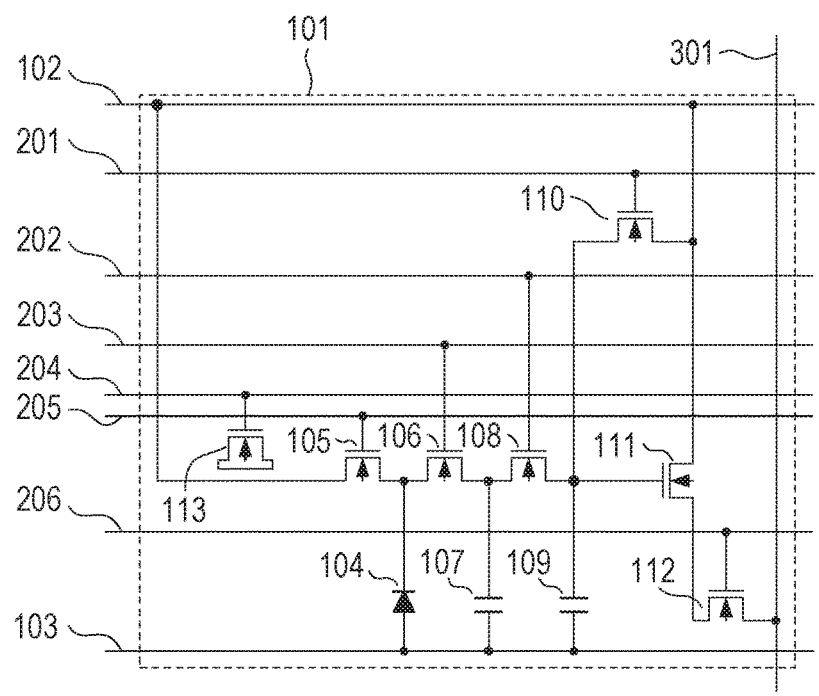
FIG. 15 is a diagram illustrating an equivalent circuit of a pixel.

FIG. 15 is a diagram illustrating an equivalent circuit of the pixel 101 of the image pickup device according to a fourth embodiment. Compared to the pixel 101 according to the first embodiment, a dummy transistor 113 is added.

According to the present embodiment, the well of the MOS transistor composing the pixel 101 is connected to the grounding line 103 via an unillustrated contact unit. In other words, the potential of the well of the MOS transistor is a ground potential.

Each of the control line 205 and the control line 204 is provided at a position that overlaps, in a planar view, with the well included in the pixel 101.

The potential change of the control line 205 is propagated to the well of the pixel 101 via the parasitic capacity between the gate and backgate of the MOS transistor as the first transfer transistor 105. In other words, due to the potential change of the control line 205, a transitional potential change based on an impedance of the well of the pixel 101 and an impedance of the grounding line 103 occurs, separately from the potential change due to the parasitic capacity between the conductive lines described in the first embodiment.

Generally, the MOS transistor including the pixel 101 is formed by using a single well. In other words, the first transfer transistor 105, the second transfer transistor 106, the third transfer transistor 108, the reset transistor 110, the amplification unit 111, and the selection transistor 112 share a single well. Thus, potential change of the well causes a change in the potential of the amplification unit 111 and the source and drain of the selection transistor 112. When the period T1 begins or ends during the period T3 that the pixel signals of one row are being read, noise due to the potential change of the well caused by the potential change of the control line 205 is superimposed in the pixel signals of the row.

According to the present embodiment, as illustrated in FIG. 15, the pixel 101 includes the dummy transistor 113 in which the drain and source are short-circuited. Then, to the gate of the dummy transistor 113, the control line 204 is connected.

The timing to drive the control line 204 is same as that in the first embodiment. In other words, the potential of the control line 204 is in a phase reverse to the potential of the control line 205. The potential change of the control line 204 makes a change in the potential of the well through the parasitic capacity between the gate and backgate of the dummy transistor 113. The potentials of the control line 205 and the control line 204 are respectively in a reverse phase relationship. Thus, the change in the potential of the control line 204 suppresses the potential change of the well caused by the change in the potential of the control line 205.

Here, it is preferable that the shape and size (a gate length and a gate width) of the dummy transistor 113 are the same as those of the first transfer transistor 105. However, this configuration does not set any limitation, and when a dummy transistor having its gate connected to the control line 204 is included, an effect to suppress the potential change of the well due to the potential change of the control line 205 described in the present embodiment can be obtained.

Further, the potential change of the well may be suppressed by adjusting the potential difference between LOW and HIGH of the control line 204 and adjusting a gate area size of the dummy transistor 113 according to need.

As described above, the configuration according to the present embodiment can suppress, by using the dummy transistor 113, an occurrence of a potential fluctuation of the well caused by the change in the potential of the control line 205. This configuration suppresses that noise due to the potential fluctuation of the well caused by the potential fluctuation of the control line 205 is superimposed to the pixel signals in the row, even when the period T1 begins or ends during the period T3 in which pixel signals of one row are being read. However, it is preferable that the parasitic capacity caused between the well and the control line 205 and the parasitic capacity caused between the control line 204 and the well are made to be approximately same capacity values. This configuration can preferably suppress the potential fluctuation of the well caused by the potential fluctuation of the control line 205.

Here, in a case where the grounding line 103 or the well are shared by a plurality of pixels 101 of the pixel array 100, the dummy transistor 113 may be provided to a part of the pixels 101 in the pixel array 100.

Further, as described in the third embodiment, there may be a case that the pixel array 100 includes an optical black pixel having a light-shield photoelectric conversion unit 104. The dummy transistor 113 may be provided only in the optical black pixel.

Further, as described in the third embodiment, there may be a case that the pixel array 100 includes a dummy pixel which does not include the photoelectric conversion unit 104. It may be made so that only the dummy pixel includes the dummy transistor 113.

Fifth Embodiment

Figure 16:
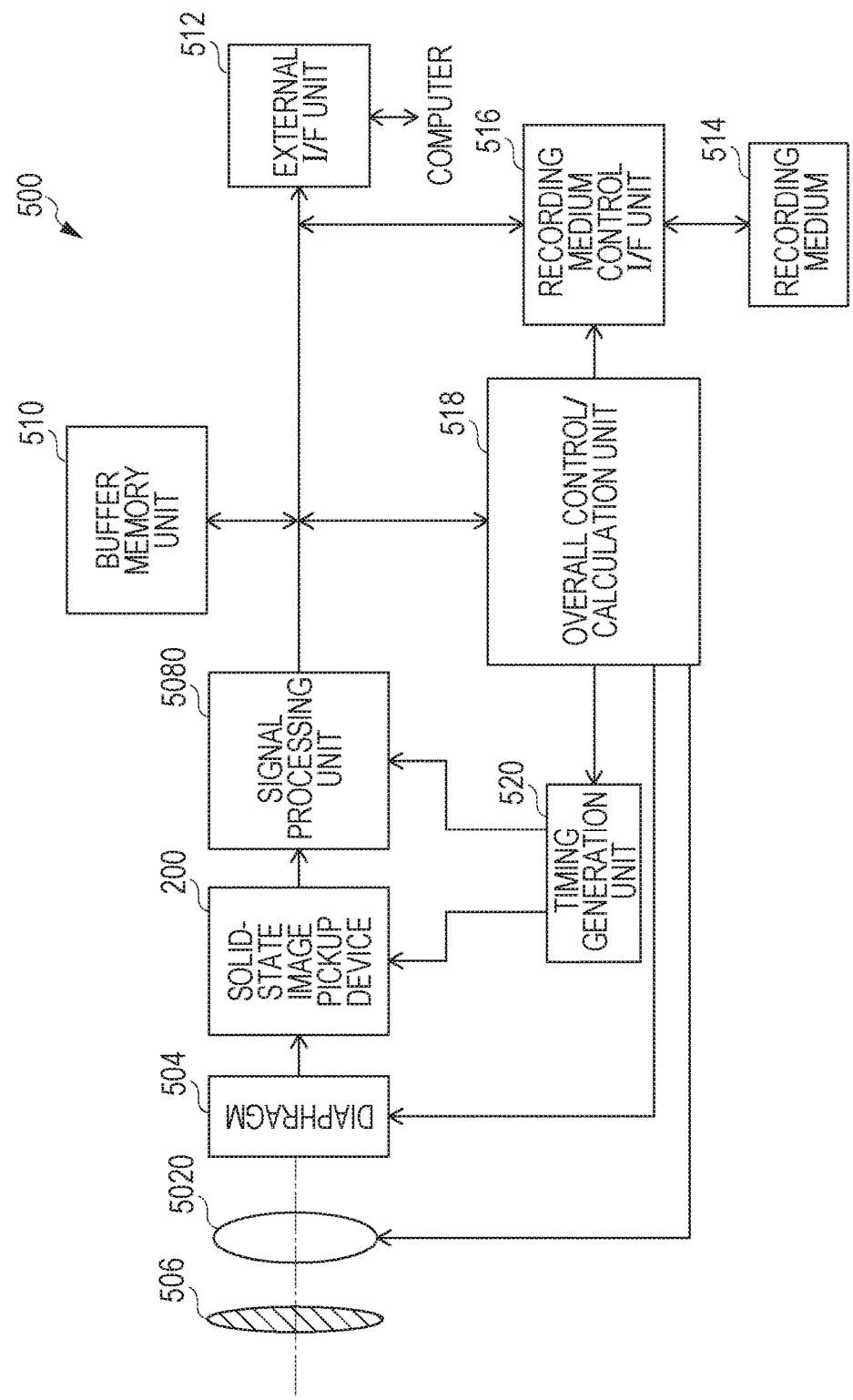
FIG. 16 is an overall diagram of an image pickup system.

FIG. 16 is a block diagram illustrating a configuration of an image pickup system 500 according to the present embodiment. The image pickup system 500 according to the present embodiment includes an image pickup device 200 to which a configuration of one of the image pickup devices described in the above respective embodiments is applied. As an illustrative example of the image pickup system 500, there may be a digital still camera, a digital camcorder, a monitoring camera, and the like. FIG. 16 illustrates a configuration example of a digital still camera to which the image pickup device 200, which is one of the image pickup devices according to the above respective embodiments, is applied.

The image pickup system 500 illustrated in FIG. 16 includes an image pickup device 200, a lens 5020 that forms an optical image of a subject in the image pickup device 200, a diaphragm 504 for making an amount of light passing through the lens 5020 variable, and a barrier 506 for protecting the lens 5020. The lens 5020 and the diaphragm 504 are an optical system for collecting light to the image pickup device 200.

The image pickup system 500 also includes a signal processing unit 5080 for processing an output signal output from the image pickup device 200. The signal processing unit 5080 performs signal processing to perform various correction and compression on input signals according to need and output the signals. The signal processing unit 5080 may include a function for performing an A/D conversion process on the output signals output from the image pickup device 200. In this case, an A/D conversion circuit does not always have to be provided inside the image pickup device 200.

The image pickup system 500 further includes a buffer memory unit 510 for temporarily storing image data, and an external interface unit (external I/F unit) 512 for communicating with an external computer and the like. Further, the image pickup system 500 includes a recording medium 514 such as a semiconductor memory for recording or reading image pickup data and a recording medium control interface unit (recording medium control I/F unit) 516 for recoding or reading data in the recording medium 514. Here, the recording medium 514 may be internally mounted in the image pickup system 500 or may be detachable.

Further, the image pickup system 500 includes an overall control/calculation unit 518 for performing various calculation and controlling the entire digital still camera and a timing generation unit 520 for outputting various timing signals to the image pickup device 200 and the signal processing unit 5080. Here, the timing signals may be input from outside, and the image pickup system 500 may include at least the image pickup device 200 and the signal processing unit 5080 for processing output signals output from the image pickup device 200. The overall control/calculation unit 518 and timing generation unit 520 may be made to perform a part of or all of the control function of the image pickup device 200.

The image pickup device 200 outputs image signals to the signal processing unit 5080. The signal processing unit 5080 performs a predetermined signal process on the image signals output from the image pickup device 200 and outputs image data. Further, the signal processing unit 5080 generates an image by using the image signals.

The image pickup system is formed by using the image pickup device according to the image pickup device of the above described embodiments and this realizes an image pickup system that can acquire an image with a better quality.

Sixth Embodiment

An image pickup system and a movable body according to the present embodiment will be described with reference to FIGS. 17A to 18.

Figure 17A:
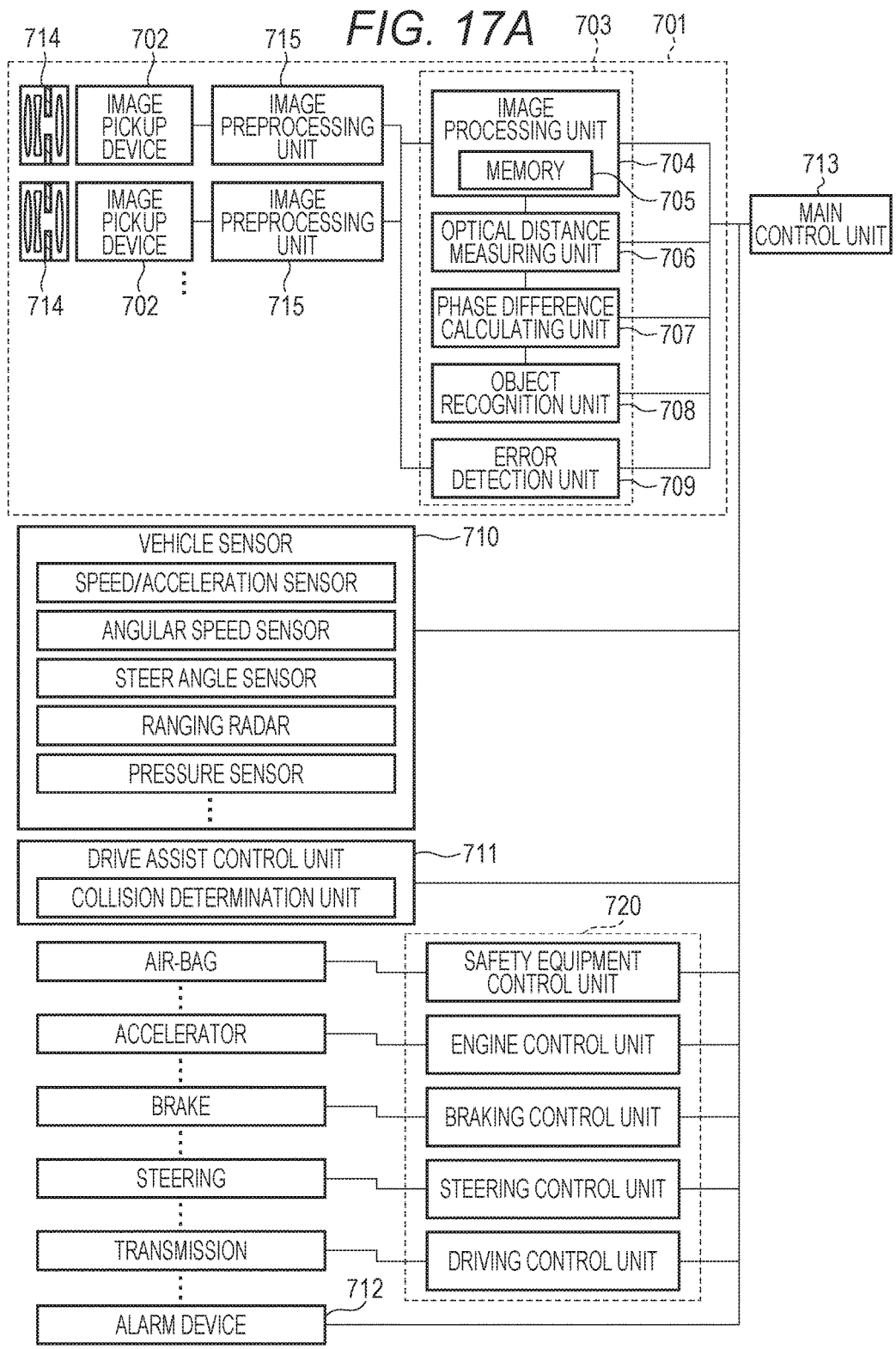
FIGS. 17A and 17B are overall diagrams of a movable body.
Figure 17B:
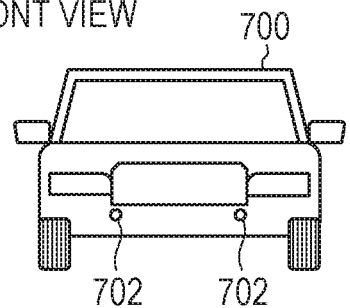
Figure 17B:
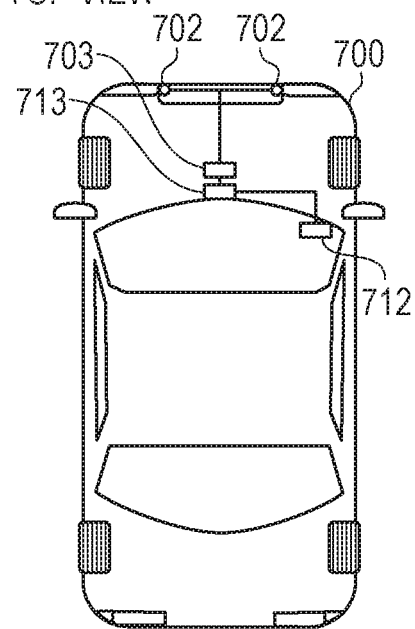
Figure 17B:
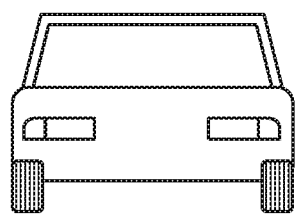
Figure 18:
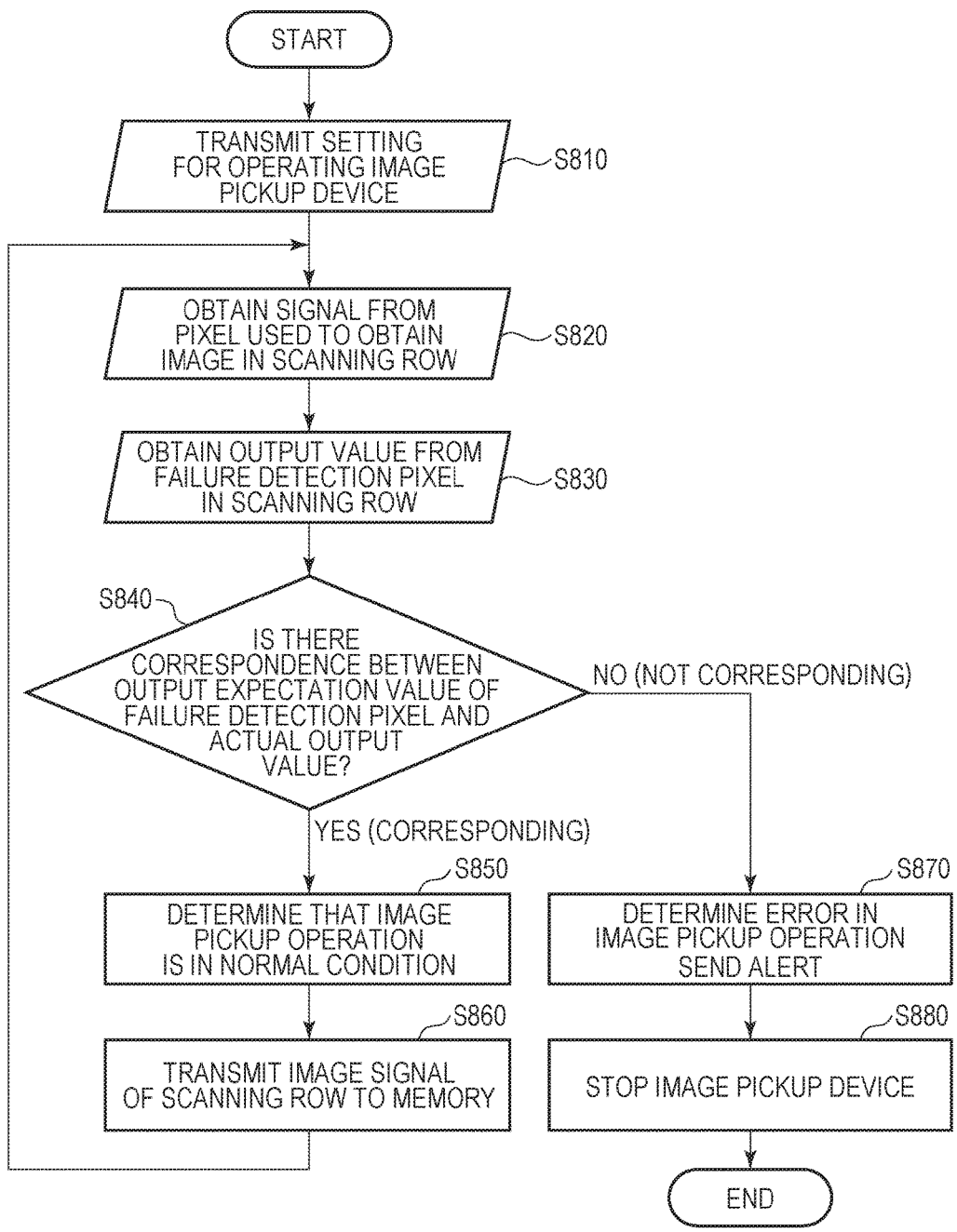
FIG. 18 is a diagram illustrating a control flow of the movable body.

FIGS. 17A and 17B are schematic diagrams illustrating a configuration example of the image pickup system and the movable body according to the present embodiment. FIG. 18 is a flowchart illustrating an operation of the image pickup system according to the present embodiment.

In the present embodiment, an example of the image pickup system related to an on-vehicle camera will be described. FIGS. 17A and 17B illustrate an example of a vehicle system and an image pickup system which is mounted in the vehicle system. The image pickup system 701 includes an image pickup device 702, an image preprocessing unit 715, an integrated circuit 703, and an optical system 714. The optical system 714 fixes an optical image of a subject on the image pickup device 702. The image pickup device 702 converts the optical image of the object fixed by the optical system 714 into an electric signal. The image pickup device 702 is an image pickup device according to one of the above embodiments. The image preprocessing unit 715 performs a predetermined signal processing on signals output from the image pickup device 702. The function of the image preprocessing unit 715 may be built in the image pickup device 702. In the image pickup system 701, at least two sets of the optical system 714, the image pickup device 702, and the image preprocessing unit 715 are provided and an output from the image preprocessing unit 715 in each set is input to the integrated circuit 703.

The integrated circuit 703 is an integrated circuit to be used in the image pickup system and includes an image processing unit 704 including a memory 705, an optical distance measuring unit 706, a phase difference calculating unit 707, an object recognition unit 708, and an error detection unit 709. The image processing unit 704 performs image processing such as a development process, a defect correction, and the like on output signals of the image preprocessing unit 715. The memory 705 stores a primary memory of a pickup image and a defect position of an image pickup pixel. The optical distance measuring unit 706 performs a subject focusing and a distance measurement. The phase difference calculating unit 707 calculates disparity (phase difference of disparity images) based on a plurality of pieces of image data acquired by a plurality of image pickup devices 702. The object recognition unit 708 performs a recognition of the subject such as a vehicle, a street, a sign, a person, and the like. The error detection unit 709 notifies an error to the main control unit 713 when an error of the image pickup device 702 is detected.

The integrated circuit 703 may be realized with specifically designed hardware, may be realized with a software module, or may be realized with those in combination. In addition, the integrated circuit 703 maybe realized by a field programmable gate array (FPGA), an application specific integrated circuit (ASIC), and the like or may be realized with those in combination.

The main control unit 713 integrates and controls operation of the image pickup system 701, a vehicle sensor 710, a control unit 720 and the like. Here, without providing the main control unit 713, the image pickup system 701, the vehicle sensor 710, and the control unit 720 may individually include a communication interface and transmit or receive control signals via a communication network, respectively (for example, CAN standard).

The integrated circuit 703 has a function to transmit control signals or a set value to the image pickup device 702 in response to a control signal from the main control unit 713 or by its internal control unit. For example, the integrated circuit 703 transmits setting to pulse-drive the voltage switch 13 in the image pickup device 702, setting to switch the voltage switch 13 for each frame, and the like.

The image pickup system 701 is connected to the vehicle sensor 710 to detect a vehicle traveling status such as a vehicle speed, a yaw rate, a steering angle, and the like, an outer vehicle environment, and another vehicle/obstacle condition. The vehicle sensor 710 also serves as a distance information obtaining unit for obtaining distance information to a target object based on a disparity image. Further, the image pickup system 701 is connected to a drive assist control unit 711 that performs various drive assists such as self-steering, self-traveling, collision prevention function, and the like. More specifically, regarding a collision determination function, a collision estimation or a presence or absence of collision with another vehicle or obstacle based on a detection result of the image pickup system 701 and vehicle sensor 710. With this configuration, an avoidance control when a collision is estimated or a safety equipment when a collision occurs is activated.

Further, the image pickup system 701 is also connected to an alarm device 712 that gives an alarm to a driver based on a determination result by a collision determination unit. For example, in a case where a possibility of collision is high as a determination result by the collision determination unit, the main control unit 713 performs a vehicle control to avoid the collision or reduce the damage by applying brake, releasing the accelerator, reducing the engine output, or the like. The alarm device 712 alerts the driver by giving an alarm with a sound or the like, displaying alert information on a display unit screen of a car navigation system, a meter pane, or the like, or vibrate a safety belt or steering.

According to the present embodiment, environment around the vehicle such as front and back for example is captured by the image pickup system 701. FIG. 17B illustrates an example of placement of the image pickup system 701 in a case that the front of the vehicle is captured by the image pickup system 701.

A couple of image pickup devices 702 are provided in the front of the vehicle 700. More specifically, when a center line of a proceeding direction and an outer shape (for example, the width) of the vehicle 700 is assumed as a symmetrical axis, and the couple of image pickup devices 702 are placed asymmetrically with respect to the symmetrical axis, this placement is preferable to obtain distance information between the vehicle 700 and target object or determine the collision probability. Further, the image pickup device 702 is preferably provided not to disturb the view of the driver when the driver recognizes the condition outside the vehicle 700 from the driver's seat. The alarm device 712 is preferably provided so that the driver can easily recognize.

Next, a failure detection operation by the image pickup device 702 in the image pickup system 701 will be described with reference to FIG. 18. The failure detection operation by the image pickup device 702 is performed according to steps S810 to S880 in FIG. 18.

Step S810 is a step for setting the start-up of the image pickup device 702. In other words, setting to operate the image pickup device 702 is transmitted from the outside (for example, the main control unit 713) of the image pickup system 701 or from the inside of the image pickup system 701, and an image pickup operation and a failure detection operation are started by the image pickup device 702.

Next, in step S820, pixel signals are obtained from effective pixels. Further, in step S830, an output value from a failure detection pixel which is provided to detect a failure. The failure detection pixel includes a photoelectric conversion unit in the same manner as the effective pixel. To the photoelectric conversion unit, a predetermined voltage is written. The pixel used to detect a failure outputs a signal corresponding to the voltage written in the photoelectric conversion unit. Here, step S820 and step S830 may be switched.

Next, in step S840, a correspondence determination is performed based on an output expectation value of the failure detection pixel and an output value from the actual failure detection pixel.

As a result of the correspondence determination in step S840, when the output expectation value and the actual output value match, the process proceeds to step S850 to determine that the image pickup operation is being performed properly, and the process proceeds to step S860. In step S860, pixel signals in a scanning row are transmitted to the memory 705 and temporarily stored. After that, the process returns to step S820, the failure detection operation is continued.

On the other hand, as a result of the correspondence determination in step S840, when the output expectation value and the actual output value do not match, the process proceeds to step S870. In step S870, it is determined that there is an error in the image pickup operation and an alert is sent to the main control unit 713 and alarm device 712. The alarm device 712 controls the display unit to display that an error is detected. After that, in step S880, the image pickup device 702 is stopped and end the operation by the image pickup system 701 ends.

Here, the present embodiment has described an example that the flowchart is iterated for every row; however, the flowchart may be iterated for every plurality of rows or the failure detection operation may be performed for every frame.

Here, the alarm sent in step S870 may be notified to the outside of the vehicle via a wireless network.

Further, the present embodiment has explained a control not to collide with another vehicle; however, the present embodiment may be applied to a control for self-driving as following another vehicle or a control for self driving not to cross over lanes. Further, the image pickup system 701 may be applied to a movable body (a movable device) such as a boat, a ship, an aircraft, an industrial robot, and the like, in addition to a vehicle such as a private car. In addition, the application is not limited to a movable body but also a device used to widely recognize objects such as an intelligent transport system (ITS).

Modified Embodiment

The disclosure is not limited to the above embodiments and various modification may be made.

For example, an example that a part of the configuration of one of the embodiments are added to another embodiment and an example that a part of the configuration of one of the embodiments is replaced with a part of the configuration of another embodiment are also embodiments of the disclosure.

Further, the circuit arrangement of the pixels described above is not limited to what is illustrated in FIG. 2 and a change may be made according to need. For example, the pixel 101 may have a dual pixel configuration in which a couple of photoelectric conversion units are provided in a single micro lens.

Modified Embodiment

All of the above described embodiments are only specific examples to implement the disclosure, and the technical scope of the disclosure should not be understood limitedly based on these examples. In other words, the disclosure can be implemented in various manners within the technological thought or its major characteristics. Further, the above described embodiment may be combined in various manners and implemented.

Effect of the Invention

According to the disclosure, an effect to suppress propagation of a change in potential of a control line used to perform a global electronic shutter operation to another line can be obtained.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-143685, filed Jul. 25, 2017, which is hereby incorporated by reference herein in its entirety.

What is claimed is:

1. An image pickup device comprising:
   a pixel including a photoelectric conversion unit, a discharge unit, a first transistor connected to the photoelectric conversion unit and the discharge unit, a first holding unit, a second transistor connected to the photoelectric conversion unit and the first holding unit, a second holding unit, and a third transistor connected to the second transistor and the second holding unit;
   a control line connected to a gate of one of the first transistor, the second transistor, and the third transistor;
   a conductive line; and
   a control unit configured to supply, to the control line, a control signal in which potential changes in a first direction and supply, to the conductive line, a signal in which potential changes in a second direction which is a direction opposite from the first direction,
   wherein at least a part of a period that the potential of the control signal changes in the first direction overlaps with at least a part of a period that the potential of the signal changes in the second direction.

2. The image pickup device according to claim 1, wherein the conductive line is not connected to the pixel.

3. The image pickup device according to claim 1, wherein
the pixel includes the plurality of transistors including at least the first transistor, the second transistor, and the third transistor, and
the conductive line is connected to a gate of the transistor which is different from the transistor with a gate connected to the control line, of the plurality of transistors.

4. The image pickup device according to claim 1, wherein
the control line is connected to a gate of the first transistor, and
the conductive line is connected to a gate of the second transistor.

5. The image pickup device according to claim 4, wherein
the control unit sets the signal given to the conductive line to be one of a plurality of potentials including a first potential, a second potential, and a third potential, and
the first potential is a potential between the second potential and the third potential.

6. The image pickup device according to claim 5, wherein in a period that the potential of the signal changes in the second direction, the control unit changes the signal in the second direction by using two of the first potential, the second potential, and the third potential, which are used to turn off the second transistor.

7. The image pickup device according to claim 1, wherein the conductive line transmits a power source voltage of the pixel.

8. The image pickup device according to claim 1, wherein
the first holding unit is light-shielded with a light shielding film, and
the conductive line is connected to the light shielding film.

9. The image pickup device according to claim 1, further comprising
a dummy transistor,
wherein the conductive line is connected to the dummy transistor.

10. The image pickup device according to claim 9, wherein
the first transistor, the second transistor, and the third transistor are formed in a well, and
the dummy transistor is formed in the well.

11. The image pickup device according to claim 10, wherein
the control line has a part overlapping with the well in a planar view, and
the conductive line has a part overlapping with the well in the planar view.

12. The image pickup device according to claim 11, wherein a parasitic capacity generated between the control line and the well and a parasitic capacity generated between the conductive line and the well are approximately same capacity values.

13. The image pickup device according to claim 1, wherein
the pixel further includes an output unit that outputs a signal based on a potential of the second holding unit,
the output unit is connected to an output line, and
a parasitic capacity between the control line and the output line and a parasitic capacity between the conductive line and the output line are approximately same capacity values.

14. An image pickup system comprising:
the image pickup device according to claim 1; and
a signal processing unit configured to generate an image by processing a signal output from the image pickup device.

15. A movable body comprising:
the image pickup device according to claim 1; and
a distance information obtaining unit configured to obtain distance information to a target object from a disparity image based on a signal from the image pickup device,
further comprising a controller configured to control the movable body based on the distance information.

* * * * *